(12) United States Patent
Evans et al.

(10) Patent No.: US 7,222,897 B2
(45) Date of Patent: May 29, 2007

(54) METHOD OF CONSTRUCTING BUMPER INCORPORATING THERMOFORMED ENERGY ABSORBER

(75) Inventors: Darin Evans, Wixom, MI (US); Melvin Guiles, West Olive, MI (US)

(73) Assignee: Netshape Energy Management LLC, Novi, MI (US)

( * ) Notice: Subject to any disclaimer, the term of this patent is extended or adjusted under 35 U.S.C. 154(b) by 0 days.

(21) Appl. No.: 11/468,147

(22) Filed: Aug. 29, 2006

(65) Prior Publication Data

US 2006/0284431 A1 Dec. 21, 2006

Related U.S. Application Data

(63) Continuation of application No. 10/975,743, filed on Oct. 28, 2004, now Pat. No. 7,131,674, which is a continuation-in-part of application No. PCT/US03/39803, filed on Dec. 15, 2003.

(60) Provisional application No. 60/610,492, filed on Sep. 16, 2004, provisional application No. 60/484,712, filed on Jul. 3, 2003.

(51) Int. Cl.
   *B60R 19/18* (2006.01)
(52) U.S. Cl. ...................... 293/120; 293/121
(58) Field of Classification Search ............... 296/120, 296/121, 133; 29/897.2
   See application file for complete search history.

(56) References Cited

U.S. PATENT DOCUMENTS

| | | | |
|---|---|---|---|
| 2,349,907 A | 5/1944 | Kos et al. | |
| 2,903,289 A | 9/1959 | Kiix | |
| 3,011,602 A | 12/1961 | Ensrud et al. | |
| 3,231,454 A | 1/1966 | Williams | |
| 3,506,295 A | 4/1970 | Yancey | |
| 3,577,305 A | 5/1971 | Hines et al. | |
| 3,638,985 A | 2/1972 | Barton et al. | |
| 3,638,992 A | 2/1972 | Forshee | |
| 3,695,665 A | 10/1972 | Matsuura | |
| 3,727,870 A | 4/1973 | Bass | |
| 3,746,605 A | 7/1973 | Dillon et al. | |
| 3,747,968 A | 7/1973 | Hornsby | |
| 3,768,850 A | 10/1973 | Barton et al. | |
| 3,778,093 A | 12/1973 | Renner | |
| 3,782,767 A | 1/1974 | Moore | |
| 3,782,768 A | 1/1974 | Moore | |
| 3,810,668 A | 5/1974 | Kornauser | |
| 3,837,991 A | 9/1974 | Evans | |
| 3,871,636 A | 3/1975 | Boyle | |

(Continued)

FOREIGN PATENT DOCUMENTS

DE   4239460   5/1992

(Continued)

*Primary Examiner*—Jason Morrow
(74) *Attorney, Agent, or Firm*—Price, Heneveld, Cooper, DeWitt & Litton LLP

(57) ABSTRACT

A bumper system includes a tubular beam and a thermoformed energy absorber with crush boxes formed into a base flange, such as by vacuum or thermoforming processes. The crush boxes have planar energy-absorbing sidewalls a depth of about 10 mm to 35 mm, wall thicknesses of about 1 mm to 3 mm, and are formed from polyethylene or other thermoform materials having a memory. The base flange can include thermoformed features engaging recesses in the beam, and is combinable with injection-molded or foam energy absorbers for design flexibility. In one form, the energy absorber includes a thermoformed first sheet forming crush boxes and a second sheet bonded to the first sheet to define apertured air pockets. A method of manufacture includes providing a plurality of separately usable thermoformed energy absorbers which can be used in conjunction with a common vehicle structure to vary the absorption characteristics of a vehicle bumper.

12 Claims, 18 Drawing Sheets

FIG. 39

U.S. PATENT DOCUMENTS

| | | | |
|---|---|---|---|
| 3,877,741 A | 4/1975 | Wilfert et al. |
| 3,885,074 A | 5/1975 | Chandler |
| 3,900,222 A | 8/1975 | Muller |
| 3,900,356 A | 8/1975 | Koch et al. |
| 3,902,748 A | 9/1975 | Bank et al. |
| 3,930,665 A | 1/1976 | Ikawa |
| 3,933,387 A | 1/1976 | Salloum et al. |
| 3,938,841 A | 2/1976 | Glance et al. |
| 3,971,583 A | 7/1976 | Kornhauser |
| 3,995,901 A | 12/1976 | Filbert, Jr. et al. |
| 3,997,207 A | 12/1976 | Norlin |
| 4,022,505 A | 5/1977 | Saczawa, Jr. |
| 4,029,350 A | 6/1977 | Goupy et al. |
| 4,050,689 A | 9/1977 | Barton et al. |
| 4,061,384 A | 12/1977 | Montgomery et al. |
| 4,061,385 A | 12/1977 | Schwartzberg |
| 4,070,052 A | 1/1978 | Ng |
| 4,072,334 A | 2/1978 | Seegmiller et al. |
| 4,076,872 A | 2/1978 | Lewicki et al. |
| 4,096,306 A | 6/1978 | Larson |
| 4,105,236 A | 8/1978 | Haar |
| 4,106,804 A | 8/1978 | Scrivo |
| 4,116,893 A | 9/1978 | Flanagan |
| 4,154,469 A | 5/1979 | Goupy et al. |
| 4,190,276 A | 2/1980 | Hirano et al. |
| 4,221,413 A | 9/1980 | Bonnetain |
| 4,287,250 A | 9/1981 | Rudy |
| 4,314,865 A | 2/1982 | Ottaviano |
| 4,321,989 A | 3/1982 | Meinzer |
| 4,344,536 A | 8/1982 | Oberhuber |
| 4,352,484 A | 10/1982 | Gertz et al. |
| 4,354,700 A | 10/1982 | Goupy et al. |
| 4,411,121 A | 10/1983 | Blacklin et al. |
| 4,413,856 A | 11/1983 | McMahan et al. |
| 4,427,474 A | 1/1984 | Ottaviano |
| 4,533,583 A | 8/1985 | May |
| 4,542,925 A | 9/1985 | Huber et al. |
| 4,551,379 A | 11/1985 | Kerr |
| 4,578,296 A | 3/1986 | Miyazaki et al. |
| 4,597,601 A | 7/1986 | Manning |
| 4,631,221 A | 12/1986 | Disselbeck et al. |
| 4,635,981 A | 1/1987 | Friton |
| 4,666,130 A | 5/1987 | Denman et al. |
| 4,720,261 A | 1/1988 | Fishwick et al. |
| 4,844,213 A | 7/1989 | Travis |
| 4,889,758 A | 12/1989 | Rinkewich |
| 4,890,877 A | 1/1990 | Ashtlani-Zarandl et al. |
| 4,909,661 A | 3/1990 | Ivey |
| 4,951,986 A | 8/1990 | Hanafusa et al. |
| 4,995,659 A | 2/1991 | Park |
| 5,030,501 A | 7/1991 | Colvin et al. |
| 5,033,593 A | 7/1991 | Kazuhito |
| 5,042,859 A | 8/1991 | Zhang et al. |
| 5,098,124 A | 3/1992 | Breed et al. |
| 5,106,137 A | 4/1992 | Curtis |
| 5,141,279 A | 8/1992 | Weller |
| 5,152,023 A | 10/1992 | Graebe |
| 5,165,990 A | 11/1992 | Nakano |
| 5,192,157 A | 3/1993 | Laturner |
| 5,243,722 A | 9/1993 | Gusakov |
| 5,293,973 A | 3/1994 | Thum |
| 5,306,066 A | 4/1994 | Saathoff |
| 5,356,177 A | 10/1994 | Weller |
| 5,364,682 A | 11/1994 | Tanaka et al. |
| 5,399,406 A | 3/1995 | Matsuo et al. |
| 5,425,561 A | 6/1995 | Morgan |
| 5,431,463 A | 7/1995 | Chou |
| 5,435,619 A | 7/1995 | Nakae et al. |
| 5,500,037 A | 3/1996 | Alhamad |
| 5,518,802 A | 5/1996 | Colvin et al. |
| 5,549,327 A | 8/1996 | Rüsche et al. |
| 5,564,535 A | 10/1996 | Kanlanthra |
| 5,573,272 A | 11/1996 | Teshima |
| 5,596,781 A | 1/1997 | Graebe |
| 5,636,866 A | 6/1997 | Suzuki et al. |
| 5,651,569 A | 7/1997 | Molnar |
| 5,660,426 A | 8/1997 | Sugimori et al. |
| 5,700,545 A | 12/1997 | Audi et al. |
| 5,725,266 A | 3/1998 | Anderson et al. |
| 5,727,826 A | 3/1998 | Frank et al. |
| 5,731,062 A | 3/1998 | Kim et al. |
| 5,746,419 A | 5/1998 | McFadden et al. |
| 5,762,392 A | 6/1998 | Suga |
| 5,769,003 A | 6/1998 | Rose et al. |
| 5,780,129 A | 7/1998 | Ohta |
| 5,799,991 A | 9/1998 | Glance |
| 5,806,889 A | 9/1998 | Suzuki et al. |
| 5,836,641 A | 11/1998 | Sugamoto et al. |
| 5,851,626 A | 12/1998 | McCorry et al. |
| 5,896,680 A | 4/1999 | Kim et al. |
| 5,950,835 A | 9/1999 | Moser et al. |
| 5,972,477 A | 10/1999 | Kim et al. |
| 6,007,898 A | 12/1999 | Kim et al. |
| 6,012,764 A | 1/2000 | Seksaria et al. |
| 6,017,084 A | 1/2000 | Carroll, III et al. |
| 6,082,792 A | 7/2000 | Evans et al. |
| 6,085,878 A | 7/2000 | Araki et al. |
| 6,186,582 B1 | 2/2001 | Beckmann |
| 6,199,942 B1 | 3/2001 | Carroll, III et al. |
| 6,234,526 B1 | 5/2001 | Song et al. |
| 6,247,745 B1 | 6/2001 | Carroll, III et al. |
| 6,315,339 B1 | 11/2001 | Devilliers et al. |
| 6,319,438 B1 | 11/2001 | Smith et al. |
| 6,367,361 B1 | 4/2002 | Christensen et al. |
| 6,375,251 B1 | 4/2002 | Taghaddos |
| 6,406,079 B2 | 6/2002 | Tamada et al. |
| 6,406,081 B1 | 6/2002 | Mahfet et al. |
| 6,435,579 B1 | 8/2002 | Glance |
| 6,443,513 B1 | 9/2002 | Glance |
| 6,550,855 B2 | 4/2003 | Laborie et al. |
| 6,609,740 B2 | 8/2003 | Evans |
| 6,644,701 B2 | 11/2003 | Weissenborn et al. |
| 6,679,967 B1 | 1/2004 | Carroll, III et al. |
| 6,681,907 B2 | 1/2004 | Le |
| 6,682,128 B2 | 1/2004 | Carroll, III et al. |
| 6,715,592 B2 | 4/2004 | Suzuki et al. |
| 6,752,450 B2 | 6/2004 | Carroll, III et al. |
| 7,131,674 B2 * | 11/2006 | Evans et al. ............... 296/120 |
| 2001/0035658 A1 | 11/2001 | Anderson et al. |
| 2002/0005644 A1 | 1/2002 | Tamada et al. |
| 2002/0017805 A1 | 2/2002 | Carroll, III et al. |
| 2002/0056943 A1 | 5/2002 | Bibeau |
| 2002/0060462 A1 | 5/2002 | Glance |
| 2002/0149213 A1 | 10/2002 | Weissenborn |
| 2002/0149214 A1 | 10/2002 | Evans |
| 2002/0158371 A1 | 10/2002 | Winget et al. |
| 2003/0047952 A1 | 3/2003 | Trappe |
| 2003/0080573 A1 | 5/2003 | Marijnissen et al. |
| 2004/0036302 A1 | 2/2004 | Shulen et al. |
| 2004/0178662 A1 | 9/2004 | Carroll, III et al. |

FOREIGN PATENT DOCUMENTS

| | | |
|---|---|---|
| DE | 19522575 | 1/1995 |
| DE | 19537186 | 12/1995 |
| EP | 0073478 | 3/1983 |
| FR | 2747445 | 10/1996 |
| JP | 5613849 | 10/1981 |
| JP | 360189353 | 3/1985 |
| JP | 21799 21 | 7/1990 |
| JP | 402179721 | 12/1990 |
| JP | 403266743 | 11/1991 |
| WO | 9606288 | 2/1996 |

* cited by examiner

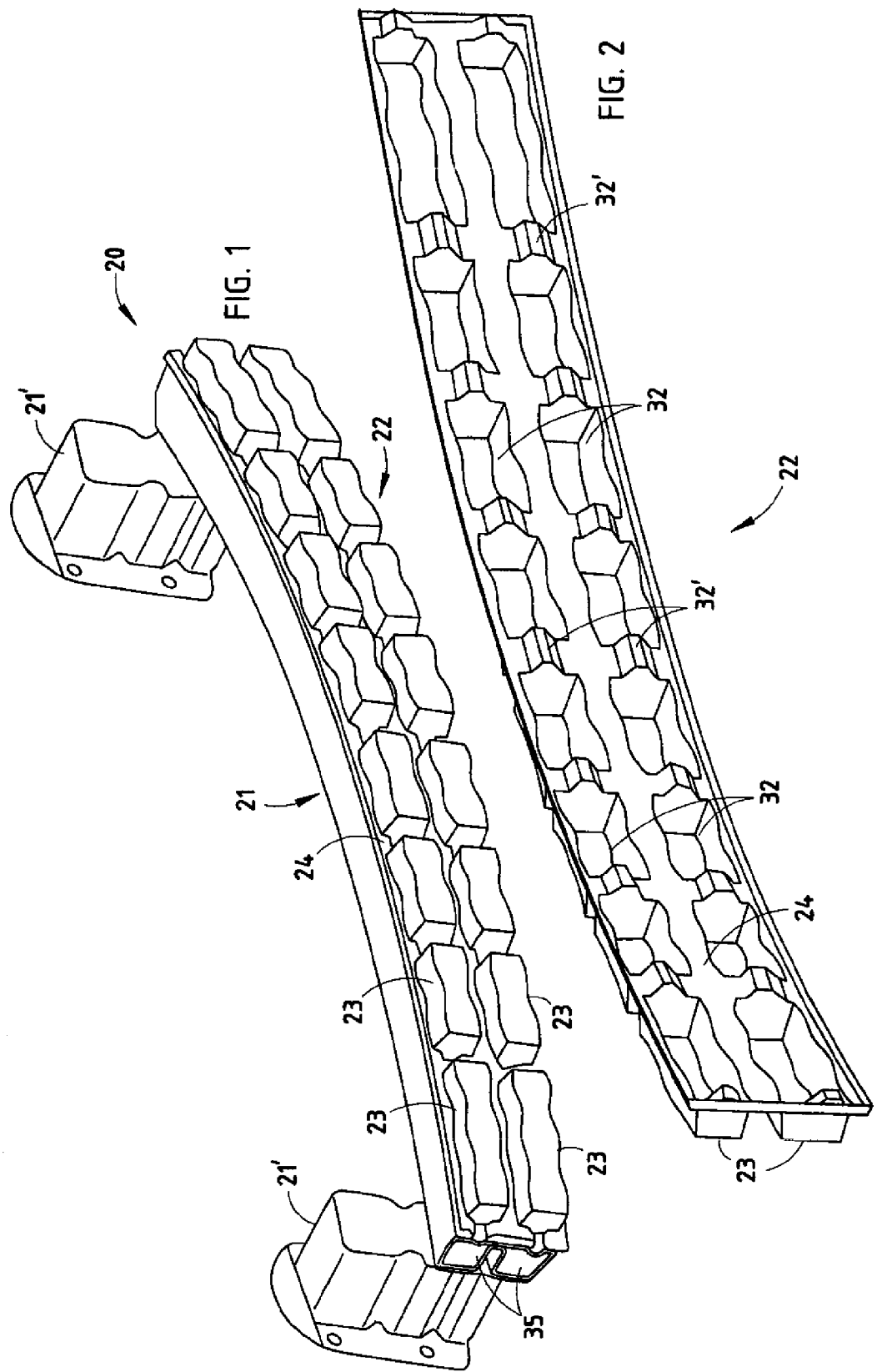

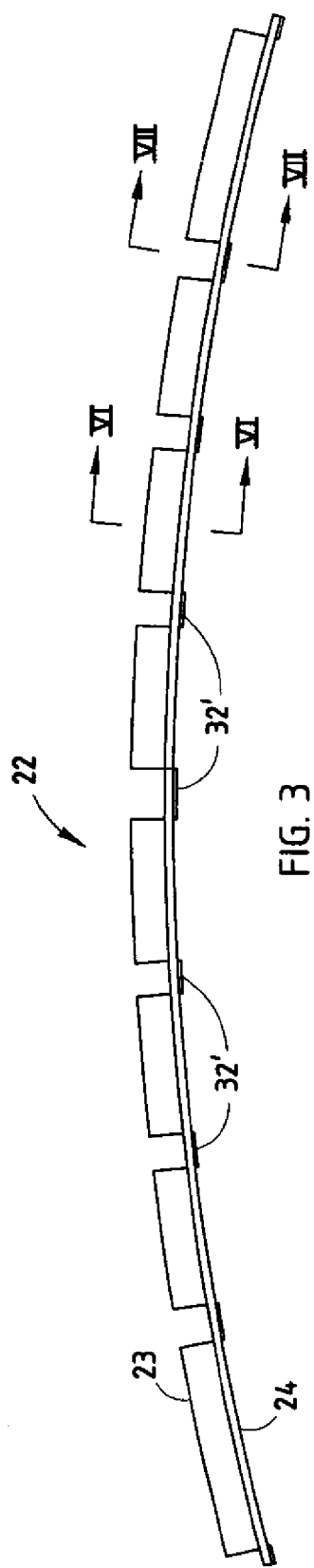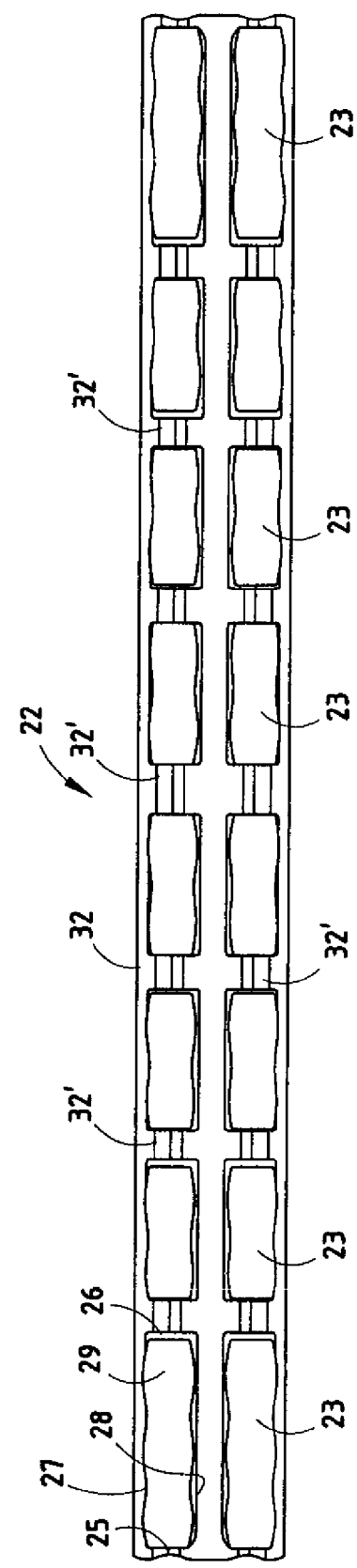

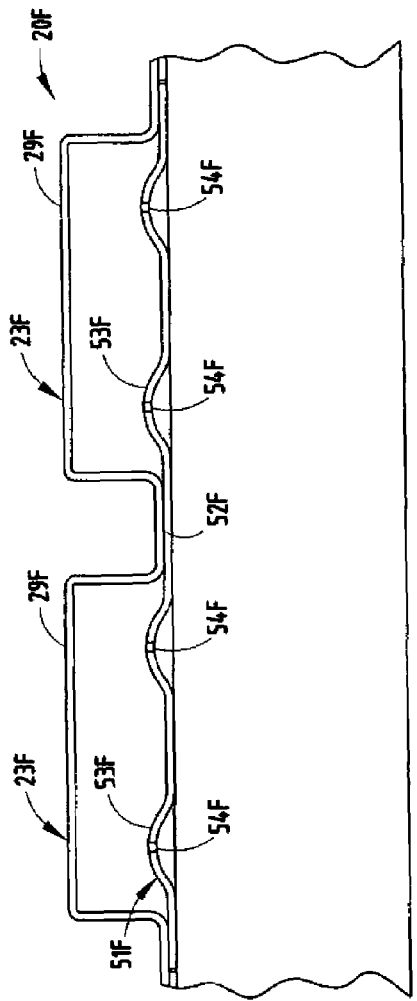
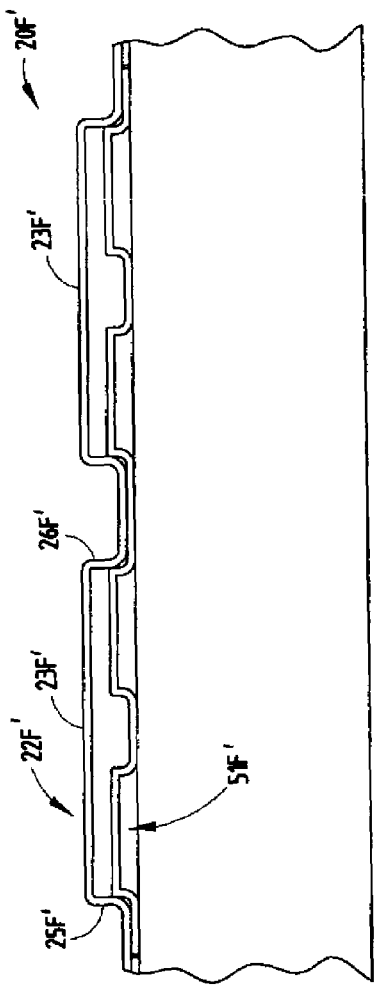
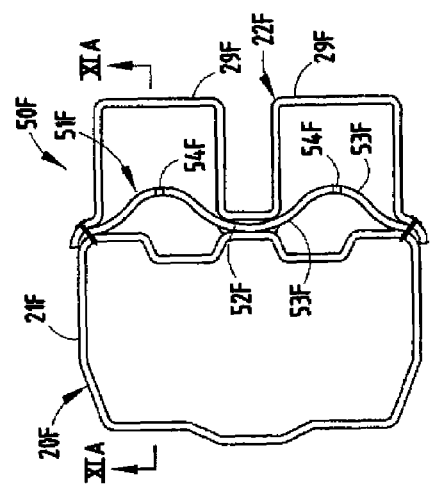
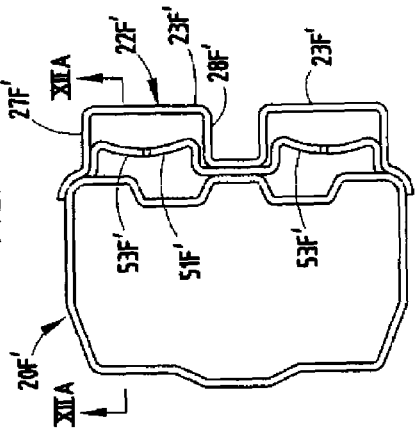

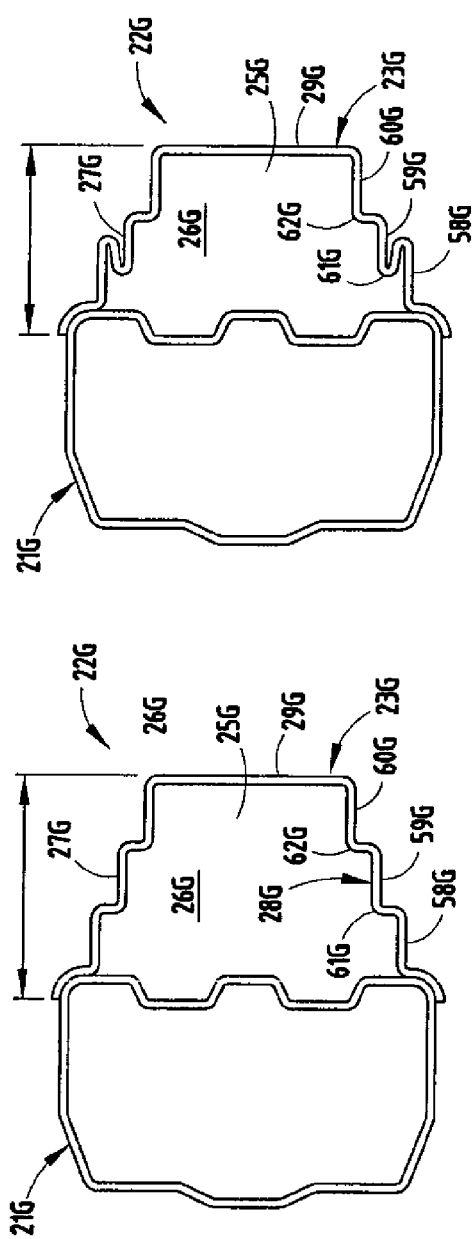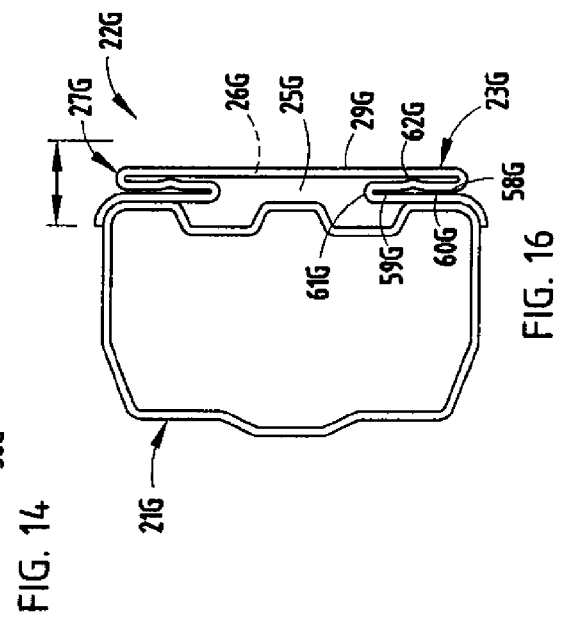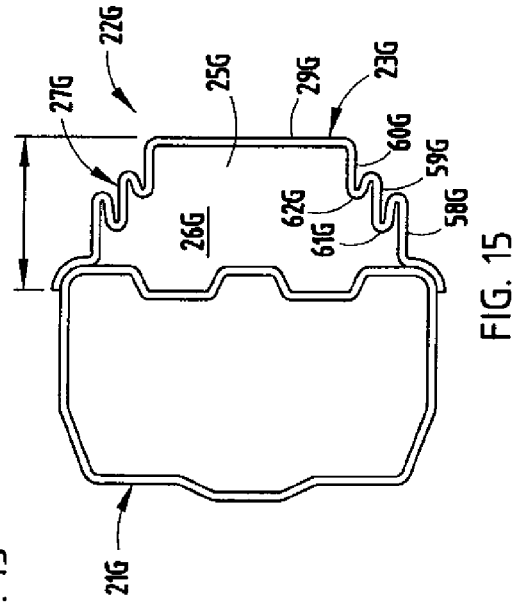

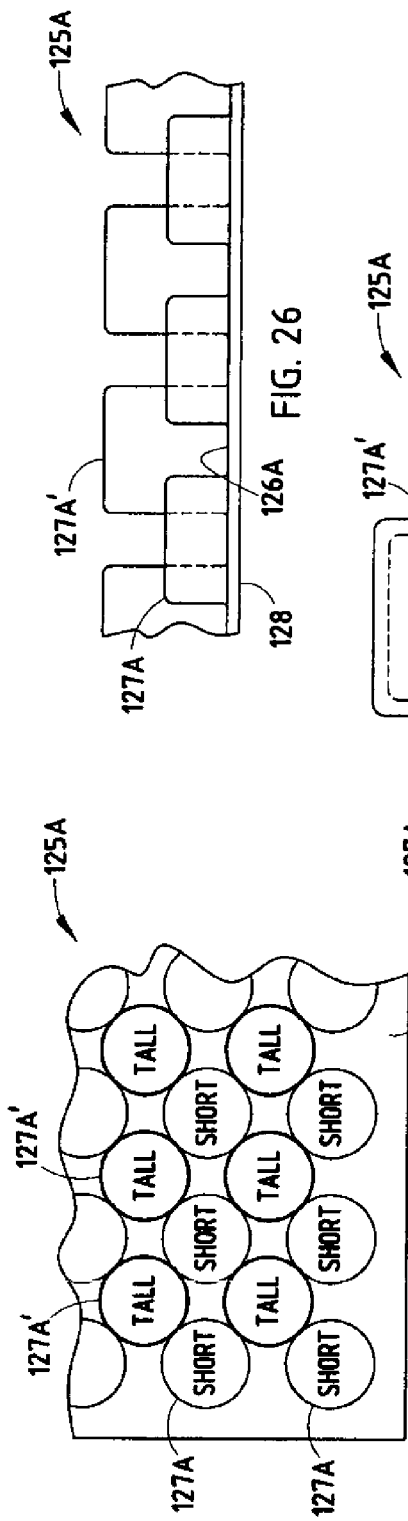
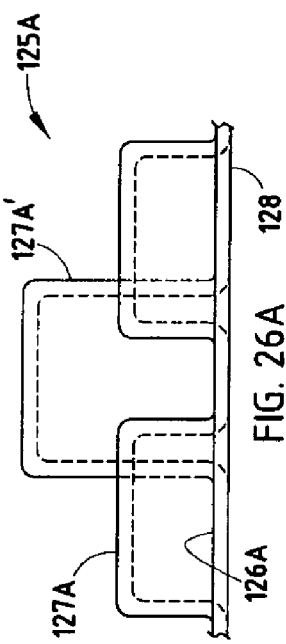
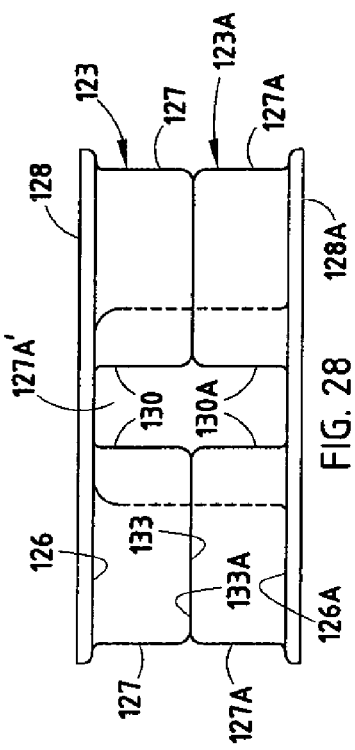
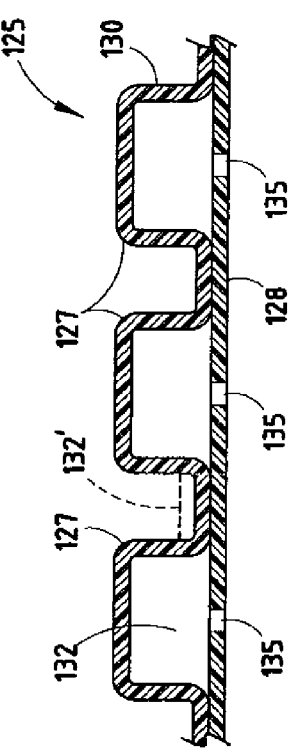

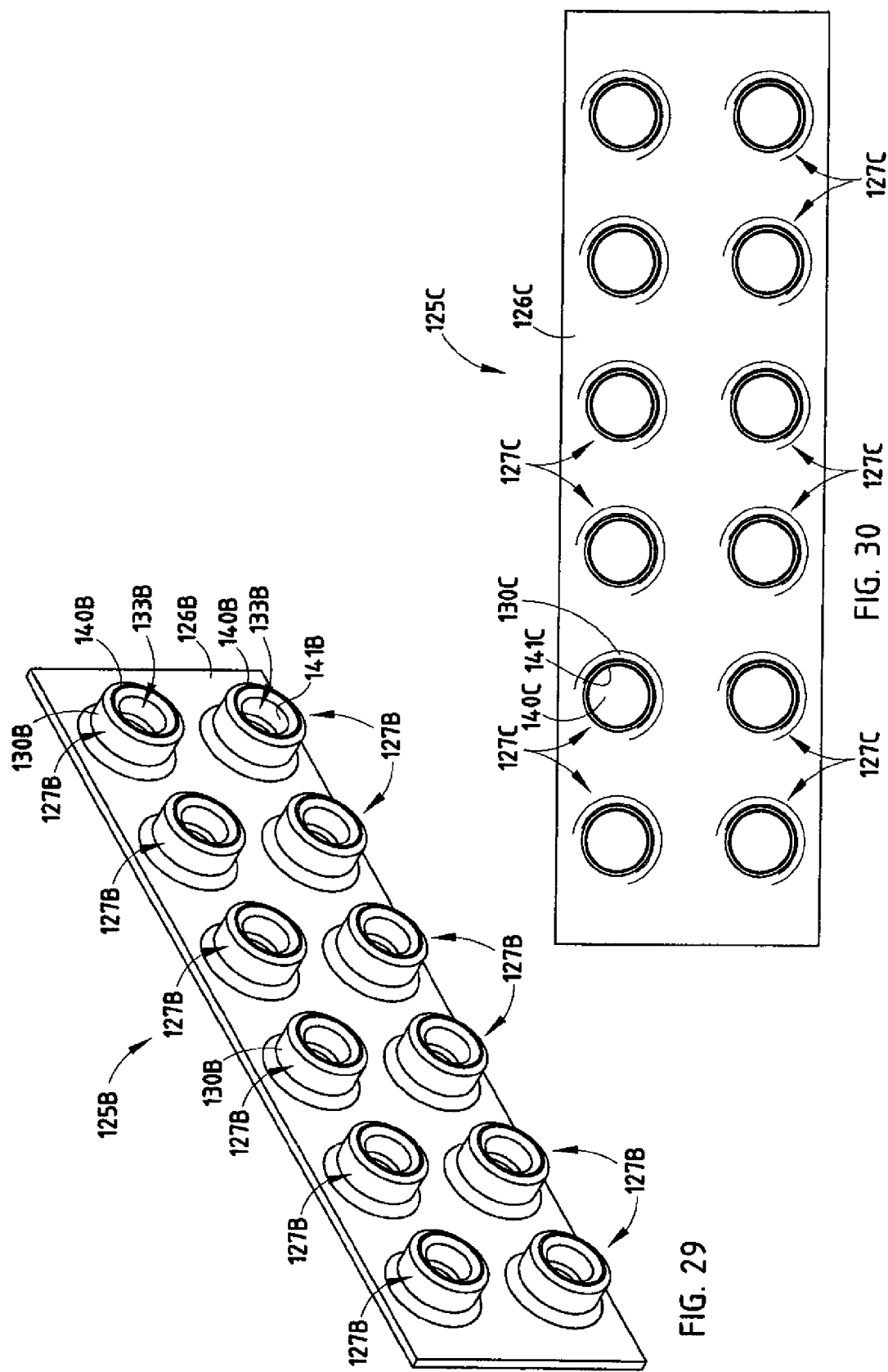

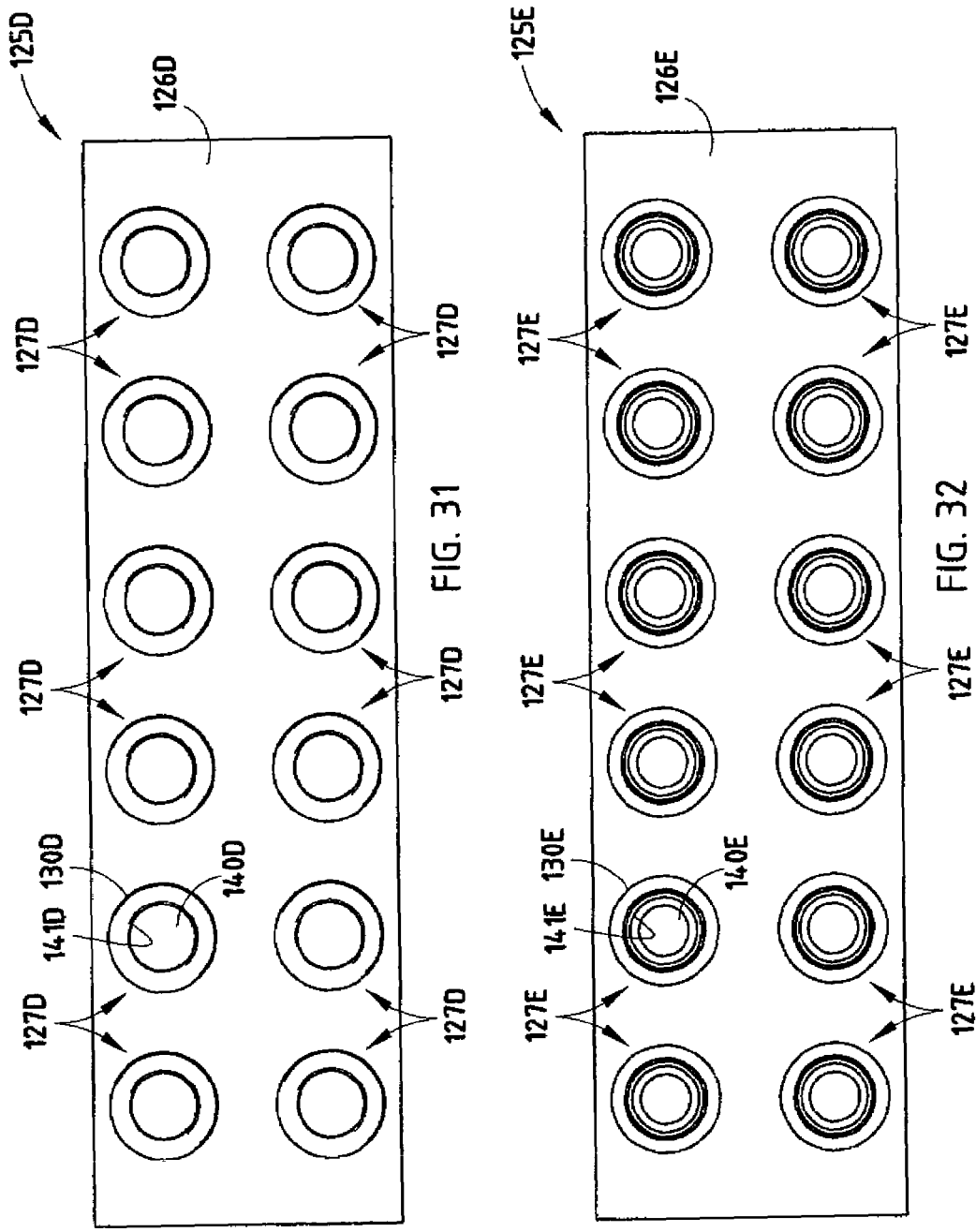

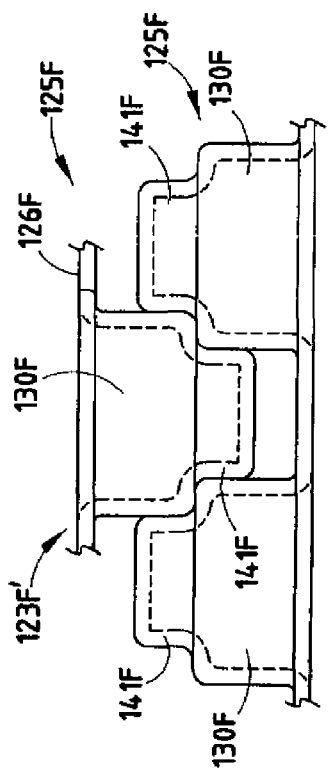
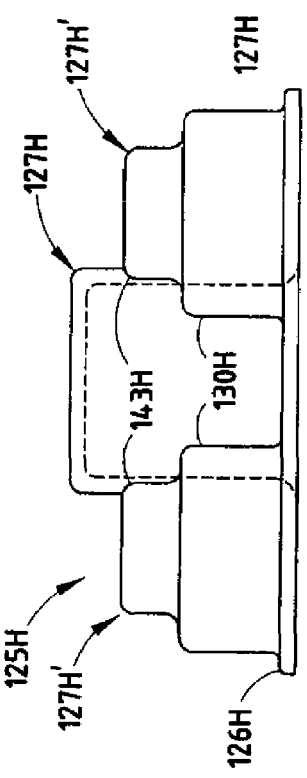
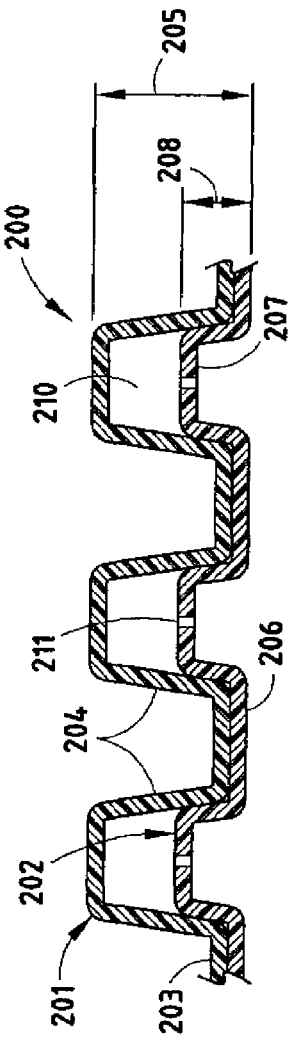
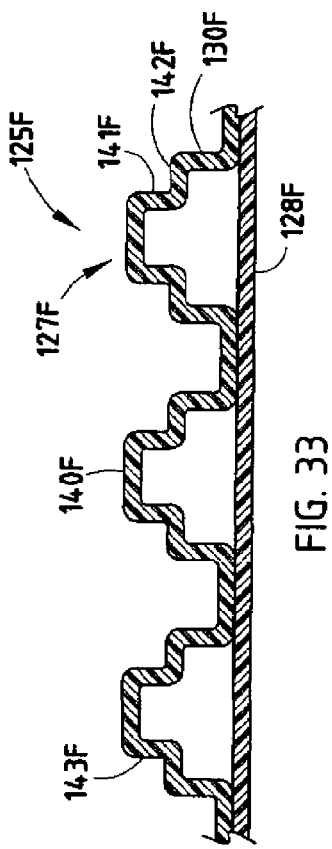
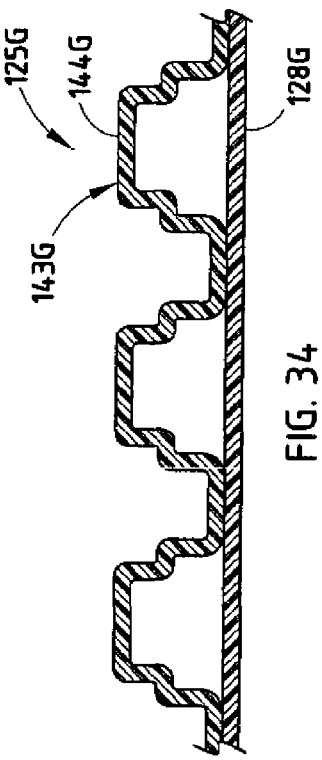

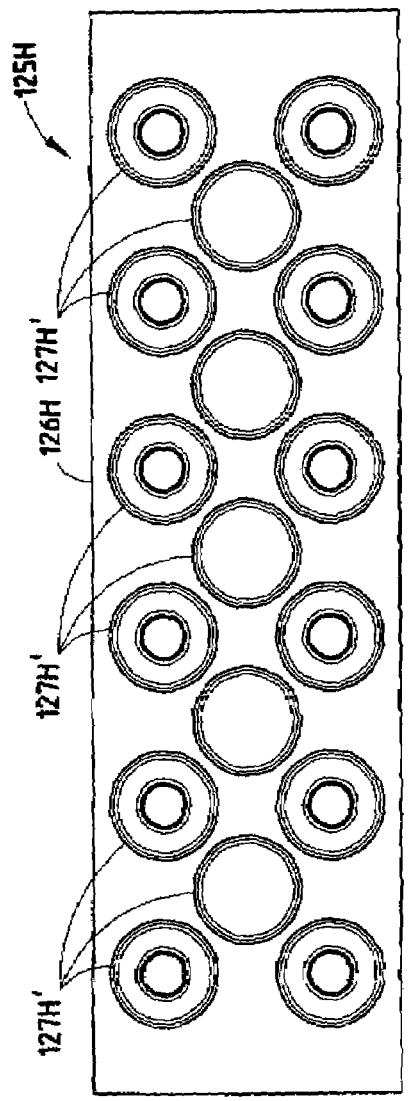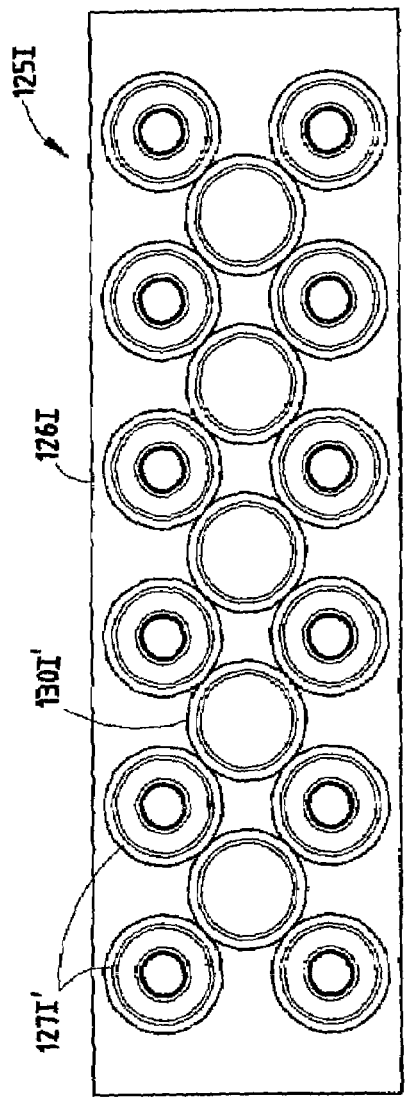
FIG. 36
FIG. 37

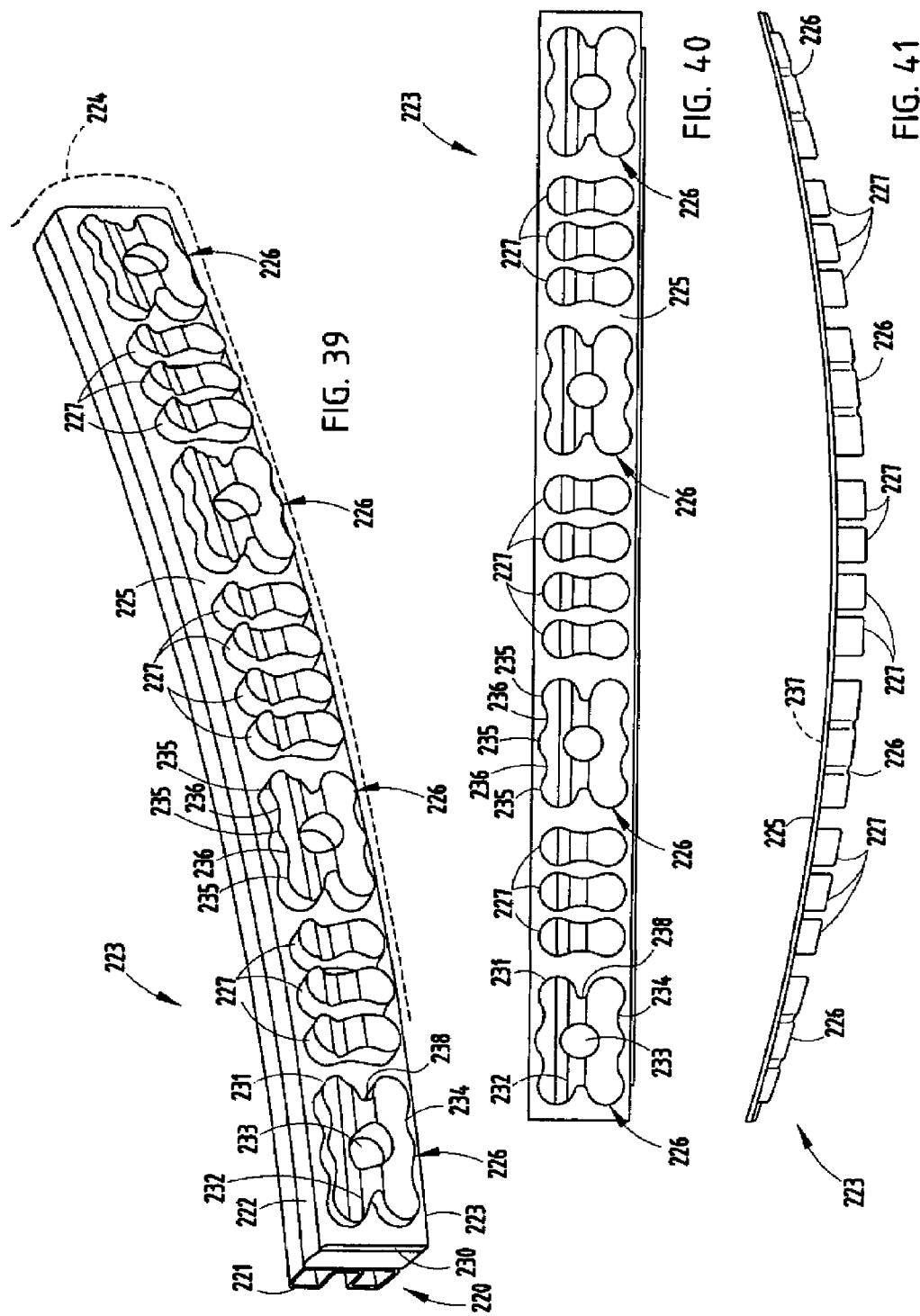

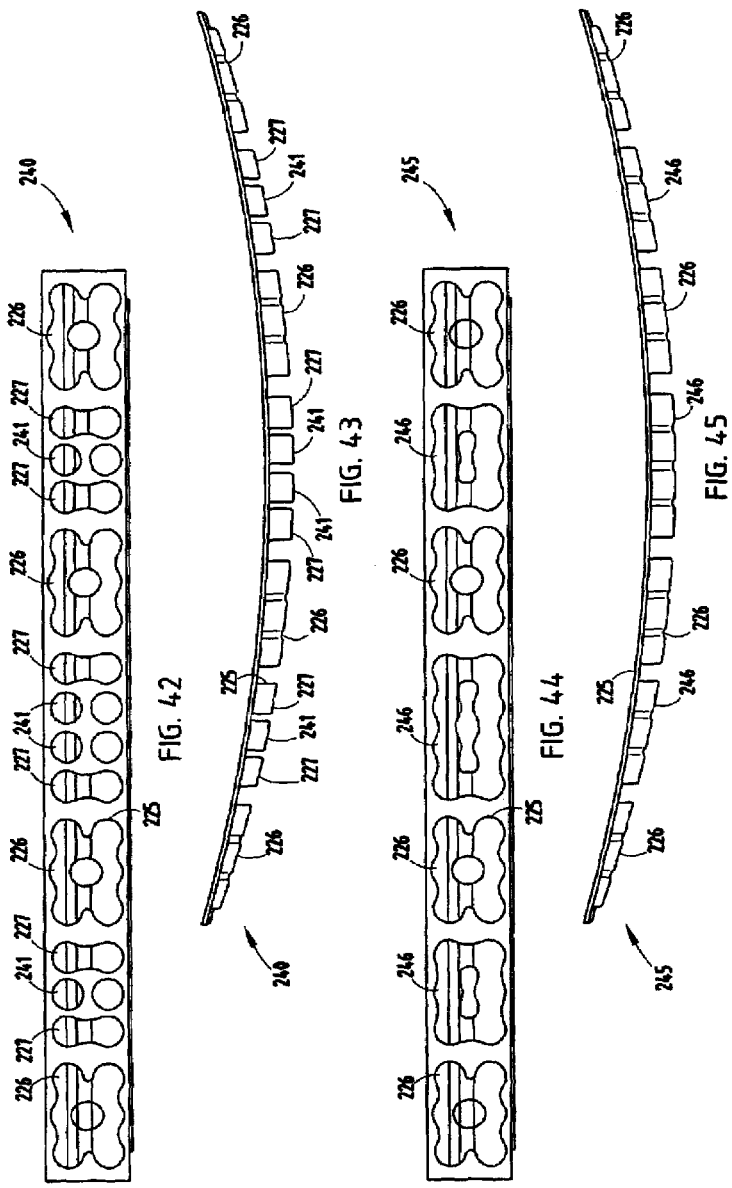

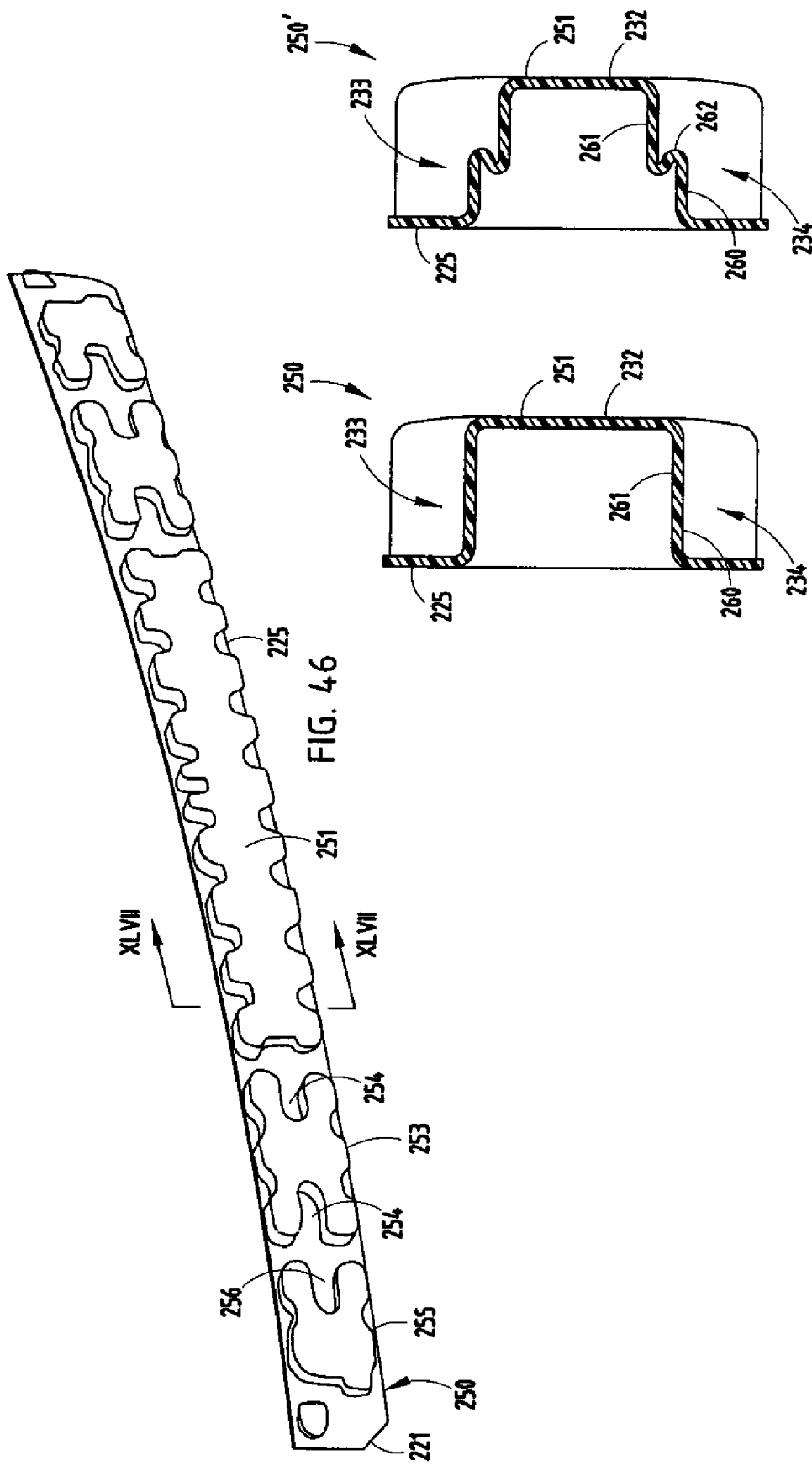

METHOD OF CONSTRUCTING BUMPER INCORPORATING THERMOFORMED ENERGY ABSORBER

CROSS REFERENCE TO RELATED APPLICATIONS

This application is a continuation of patent application Ser. No. 10/975,743, filed Oct. 28, 2004, now U.S. Pat. No. 7,131,674 entitled BUMPER SYSTEM INCORPORATING THERMOFORMED ENERGY ABSORBER, which is a continuation-in-part of co-assigned PCT application Ser. No. PCT/US03/39803, filed Dec. 15, 2003, entitled BUMPER SYSTEM INCORPORATING THERMOFORMED ENERGY ABSORBER, which in turn claims benefit of provisional application Ser. No. 60/484,712, filed Jul. 3, 2003, entitled BUMPER SYSTEM INCORPORATING THERMOFORMED ENERGY ABSORBER. This application is further a continuation-in-part of and claims benefit of provisional application Ser. No. 60/610,492, filed Sep. 16, 2004, entitled BUMPER SYSTEM HAVING THERMOFORMED ENERGY ABSORBER. The entire contents of all aforementioned applications are incorporated herein by reference in their entirety.

BACKGROUND OF THE INVENTION

The present invention relates to methods of constructing vehicle bumper systems, and in particular relates to methods of constructing bumper systems for passenger vehicles incorporating a thermoformed energy absorber.

Modern bumper systems are designed to absorb a maximum of impact energy over a given stroke. At the same time, they are designed to minimize load spikes, and to distribute energy in a manner promoting uniform and predictable collapse upon undergoing a vehicle crash. Every millimeter of space is important to energy absorption, even spaces of 10 mm or less. Further, the individual components of an energy absorbing system must combine well with other energy absorbing components, e.g. metal tubular beams and non-tubular channels, injection-molded "honeycomb" energy absorbers, foam "block" energy absorbers, hydraulic shock absorbers, crush towers and mounts, and various combinations thereof. At the same time, light weight must be maintained. Also, it is desirable to maintain an ability to customize energy absorption at selected impact zones (e.g. at a corner of the vehicle or at a center impact, such as with a post impact). Concurrently, all components of a bumper system must be flexible, and able to conform to an aerodynamic sweeping curvature of a vehicle front.

Notably, thermoformed parts have not been used much on exterior bumper systems for modern passenger vehicles, since it is generally accepted in the bumper industry that energy absorbers must be relatively deep parts (such as about 40 mm or more deep) and include significant wall thickness (e.g. 3 mm or greater wall thickness) in order to provide a good crush stroke and energy absorption during impact. Further, most injection-molded energy absorbers made of solid polymer are relatively complex parts with undulating surfaces, varied wall thicknesses, and different wall spacings to provide optimal energy absorption in different regions of the energy absorbers. This is directly in opposition to thermoformed parts, which are basically limited to relatively short depths, relatively thin wall thicknesses (or at least reduced wall thicknesses in stretched areas), and no undercut/blind surfaces. Thus, for years, original equipment manufacturers of passenger vehicles have avoided using thermoformed parts, despite the fact that thermoformed molds generally cost less, require shorter lead times, provide faster cycle times, have lower thermal energy use, generate less waste, and are more environmentally friendly processes. Skilled artisans in bumper design have apparently not fully realized the unexpected added benefits that thermoformed parts can offer when combined with other energy absorbing systems and components.

Modern vehicle bumper systems often incorporate an injection-molded polymeric energy absorber on a face of a metal reinforcement beam, and thereafter cover the energy absorber and beam with a fascia. The cost of energy absorbers and also the cost of tooling and machine time can be significant. It is desirable to use a single energy absorber on different vehicle models, even when a shape of the fascia for the vehicles is slightly different in order to achieve higher part volumes. Sometimes a single energy absorber can be designed to work for two different fascia shapes, but this usually results in some undesirable gap(s) between the energy absorber and the fascia that it is supporting. This can result in sagging and drooping of the fascia in the area of the gaps due to lack of support, potentially leading to consumer complaints and/or the appearance of poor quality in the bumper system. It is desirable to provide a system where similar bumper systems can use the same energy absorber, even when a shape of the reinforcement beam and the associated fascia are slightly different in shape.

Another requirement of bumper systems is that they be able to provide a desired optimal energy absorption profile (i.e. energy absorption force vs displacement upon impact). As vehicles become smaller, the "package" space available for the bumper system also becomes smaller. It is important that every portion of the bumper stroke be used to absorb impact energy, even when the space is as little as 10 mm to 20 mm. Also, it is important that the energy absorber crush flat when impacted, so that it does not take up unnecessary space as the bumper system nears an end of its crush stroke. It is also important that the energy absorber be tunable to "adjust" energy absorption profile, which can be done in thermoformed parts by changing materials or by changing a thickness of the sheet being thermoformed.

Accordingly, a bumper system is desired having the aforementioned advantages and solving the aforementioned problems.

SUMMARY OF THE PRESENT INVENTION

In one aspect of the present invention, a method of constructing a bumper system comprises steps of providing a structural beam, and providing a polymeric energy absorber constructed to fit against a face of the structural beam. The method further includes thermoforming first and second energy absorbers each constructed to interchangeably fit against a face of the polymeric energy absorber but each defining a differently-shaped front surface adapted to support differently-shaped fascia for a vehicle, whereby the first and second energy absorbers can be selectively attached or left off as part of constructing different bumper systems for a vehicle front end assembly.

In another aspect of the present invention, a method of constructing a bumper system includes steps of providing a structural beam, and providing a first energy absorber constructed to fit against a face of the structural beam and adapted to support a first-shaped fascia for a vehicle. The method further includes thermoforming a second energy absorber constructed to matably fit against a face of the first energy absorber, the second energy absorber including a front surface shaped differently from a face of the first energy absorber such that the second energy absorber is adapted to support a second differently-shaped fascia for a vehicle, whereby the second energy absorber can be selectively attached or left off as part of constructing different bumper systems for a vehicle front end assembly.

In another aspect of the present invention, a method of constructing a bumper system includes steps of providing a structural beam, and thermoforming first and second energy absorbers each constructed to interchangeably fit against a face of the structural beam but each defining a differently-shaped front surface adapted to support differently-shaped fascia for a vehicle. By this arrangement, the first and second energy absorbers can be selectively attached or left off as part of constructing a different bumper system for a vehicle front end assembly.

In still another aspect of the present invention, a method of tuning an impact-absorbing system to have optimized energy absorption properties upon impact, includes steps of providing a beam assembly including a structural beam, and providing a first sheet of material having known first properties and a first thickness. The method further includes thermoforming a first energy absorber from the first sheet of material, the first energy absorber being constructed to fit against a face of the beam assembly and being configured to support an aesthetic cover. The method further includes providing a second sheet of material different from the first sheet of material in at least one of properties or thickness, and thermoforming a second energy absorber from the second sheet of material, the second energy absorber having different energy absorption characteristics. The method still further includes assembling the first and second energy absorbers at separate times to a beam assembly as part of tuning the system to have a desired rate of energy absorption, whereby the energy absorption of the system can be quickly and easily tuned late in a vehicle development program.

These and other features, objects, and advantages of the present invention will become apparent to a person of ordinary skill upon reading the following description and claims together with reference to the accompanying drawings.

BRIEF DESCRIPTION OF DRAWINGS

FIG. 1 is a perspective view of a bumper system incorporating a pair of mounts, a tubular beam, and a thermoformed energy absorber;

FIGS. 2-5 are perspective, top, front, and end views of the thermoformed energy absorber of FIG. 1;

FIG. 11 is a cross-sectional view of a third modified bumper system similar to FIG. 10, but including a double-layer thermoformed energy absorber incorporating an air-cushioning feature;

FIG. 11A is a cross-sectional view taken along the line XIA-XIA in FIG. 11;

FIG. 12 is a cross-sectional view of a fourth modified bumper system similar to FIG. 11, but having a modified energy absorber;

FIG. 12A is a cross section taken along line XIIA-XIIA in FIG. 12;

FIG. 13 is a cross-sectional view of a fifth modified energy absorber similar to FIG. 1, but having a sidewall with a three-tier stepped construction;

FIGS. 14-16 are cross sections similar to FIG. 13, showing a crush sequence upon impact of the energy absorber of FIG. 13;

FIGS. 25-26 are plan and side views of a modified energy absorber, and FIG. 26A is an enlarged sectional view of a portion of FIG. 26;

FIG. 27 is a second modified energy absorber;

FIG. 28 is an enlarged fragmentary sectional view of the energy absorber of FIG. 23;

FIG. 29 is a perspective view of another modified energy absorber, including a pattern of thermoformed crush boxes;

FIGS. 30-37 are views of additional modified thermoformed energy absorbers, FIGS. 30-32 and 36-37 being plan views, and FIGS. 33-35 being side cross-sectional side views;

FIG. 33A is a cross-sectional view of another modified energy absorber, including a laminated assembly of two sheets of FIG. 33, with opposing interfitting thermoformed crush boxes and two backing sheets providing trapped air in the crush boxes; and FIG. 38 is a cross-sectional view of another modified energy absorber, including first and second thermoformed sheets with crush boxes thermally vacuum formed therein and located to interfit and trap air therebetween.

FIGS. 39-41 are perspective, front, and side views of a first bumper system, FIG. 39 showing a reinforcement beam, injection-molded energy absorber, a thermoformed energy absorber, and a fascia;

FIGS. 42-43 are a front and side view of a first modified thermoformed energy absorber;

FIGS. 44-45 are a front and side view of a second modified thermoformed energy absorber;

FIG. 46 is a perspective view of a third modified thermoformed energy absorber; and FIG. 47 is a cross-sectional view taken along lines XLVII in FIG. 46, and FIG. 48 is a cross section similar to FIG. 47, but modified therefrom.

DETAILED DESCRIPTION OF THE PREFERRED EMBODIMENTS

Figure 5:
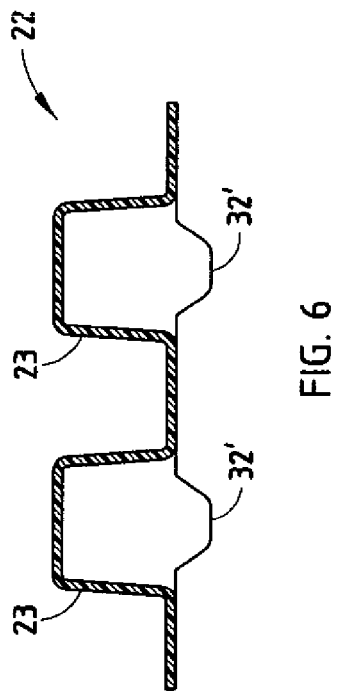
Figure 6:
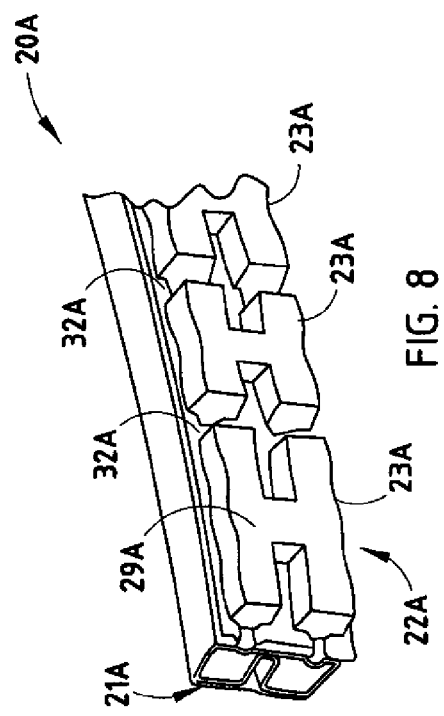
FIGS. 6-7 are cross-sections taken along the lines VI-VI and VII-VII in FIG. 3.
Figure 7:
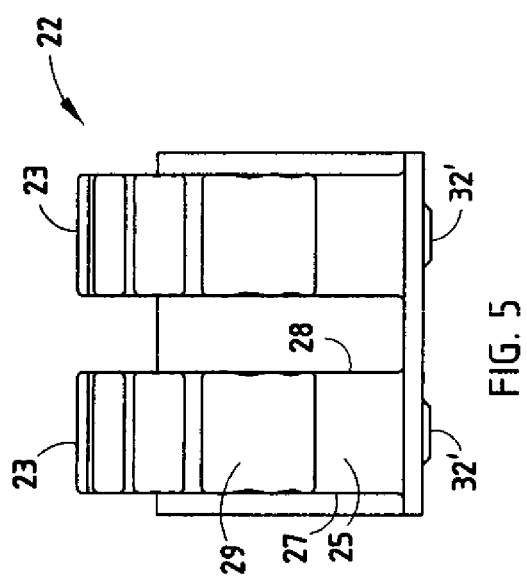
Figure 8:
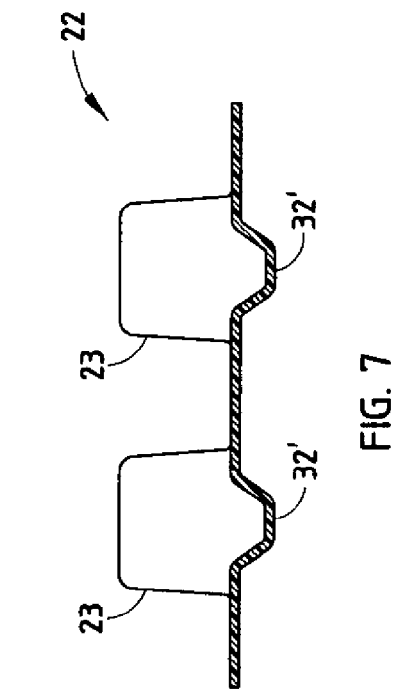
FIG. 8 is a partial perspective view of a first modified bumper system similar to FIG. 1.
Figure 9:
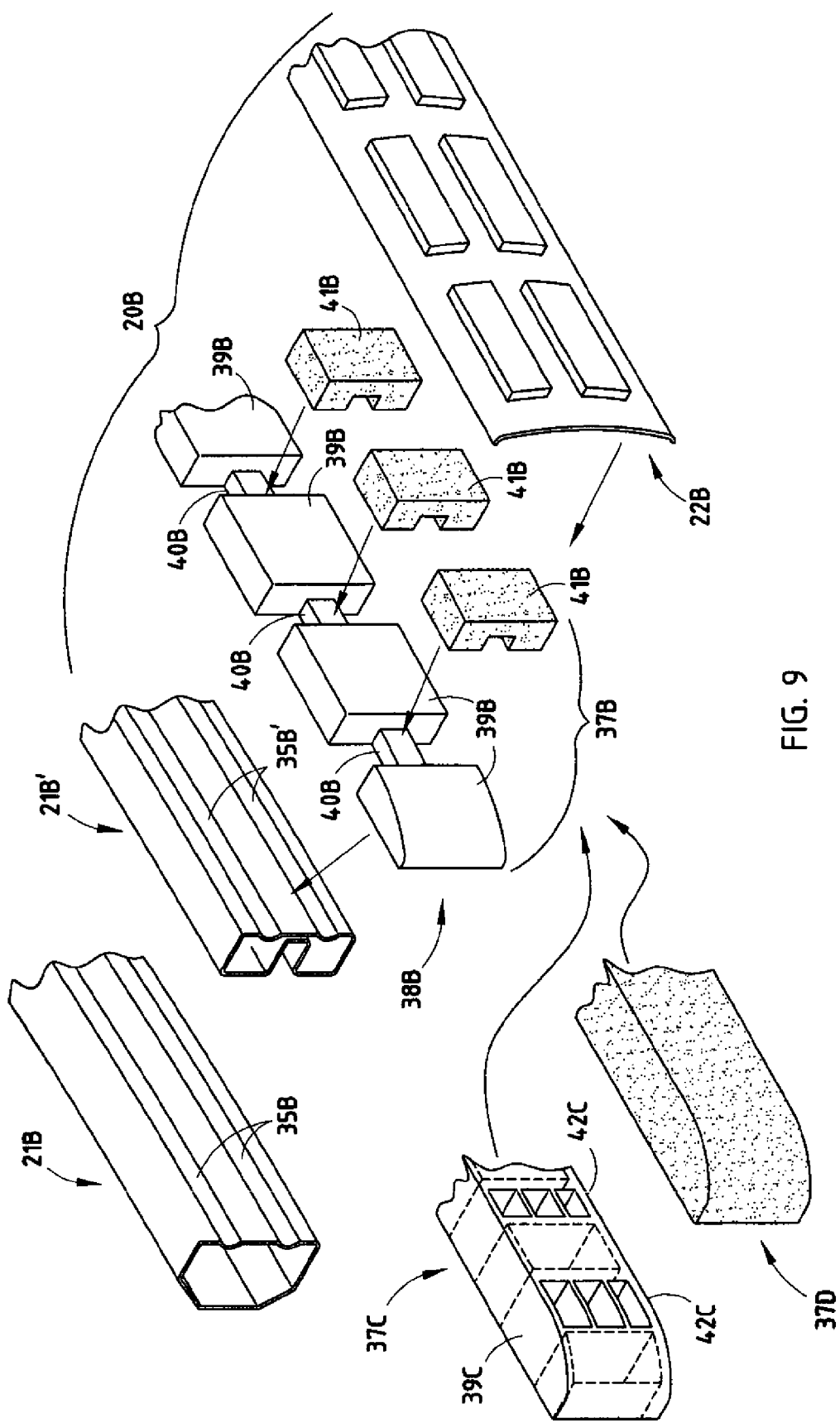
FIG. 9 is an exploded perspective view of second modified bumper system, similar to FIG. 1, but showing alternative intermediate energy absorbers between the beam and thermoformed energy absorber of FIG. 1.

A bumper system 20 (FIG. 1) includes a B-shaped rollformed and swept tubular beam 21 with mounts 21' adapted for attachment to front rails of a vehicle frame, and a thermoformed energy absorber 22. The energy absorber 22 has a base flange 24, and a plurality of thermoformed crush boxes 23 thermally deformed from the material of the base flange 24, such as by vacuum forming processes. The crush boxes 23 each have planar energy-absorbing sidewalls 25-28 (FIG. 4) and a face wall 29 to form a box shape with the base-flange-side of the box shape being open. The crush boxes 23 have a thickness (i.e. height) of anywhere from about 10 mm to 60 mm, and more preferably a height of about 20 mm to 30 mm, depending on a space in front of the beam 21 as it sweeps around a front of the vehicle. The vacuum formed energy absorber has a shape chosen to support fascia on the beam 21. It is contemplated that differently shaped energy absorbers 22 can be mated with the same beam 21 to provide fascia support on different vehicle models. Given the short lead times and low cost of tooling for thermoformed parts, and the high cost for tooling for beams 21 and other injection-molded energy absorbers, this is considered to be a tremendous advantage.

The walls 25-29 of the crush boxes 23 can have wall thicknesses of any thickness, such as about 1 mm to 3 mm, but preferably have a wall thickness of about 2.0 mm or less, or more preferably a wall thickness of about 1.5 mm or less, and potentially have a wall thickness of about 1.0 mm or less. In particular, the thickness of the walls that are stretched during the thermoform vacuum-assisted process can be reduced significantly, especially at sharp radii. Notably, the depth and wall thicknesses are somewhat enlarged in the views of FIGS. 1-7 to better illustrate the present invention.

The thermoformed energy absorber 22 can be formed from any thermoformable material, but is preferably formed from polyethylene polymer, such as high density polyethylene ("HDPE"), which has memory and will recover and flex back toward an original thermoformed shape after being crushed during a vehicle impact. It is also conceived that a shape similar to the illustrated energy absorber 22 can be injection-molded, although the cost of tooling for such may be significantly more expensive than for a thermoformed part. The base flange 24 has thermoformed features 32' (FIG. 2) engaging one of the two longitudinal channels or recesses 35 in a face of the beam 21, thus helping retain the energy absorber 22 on the beam 21. By changing material thickness, material type, corner radius, and other factors, the energy absorber 22 can be tuned to provide optimal energy absorption for the system.

The bumper beam 21 can be a variety of different shapes and profiles. The illustrated beam 21 is "B" shaped, but it is conceived that it could be "D" shaped, "C" shaped, or other shapes. The illustrated beam is rollformed and tubular, which is a preferred mode based on its strength and relatively lower cost.

The energy absorber 22 (FIGS. 3-4) includes upper and lower horizontal rows of crush boxes 23. The upper and lower crush boxes 23 are vertically about equal in height, and are about equal to the respective top and bottom tubular sections of the "B" beam 21, which they are positioned in front of. Thus the top and bottom walls 27-28, which extend horizontally, are generally aligned or slightly inboard with the horizontal top and bottom walls of the respective tubular section of the "B" beam 21 behind them. Further, the walls 27-28 (and potentially also the walls 25-26) are wavy or undulated for increased strength and stability.

The crush boxes 23 can be varied in length, height, and size to optimize crush strength in selected regions of the bumper system. For example, the illustrated crush boxes 23 near the ends of beam 21 in FIGS. 3-4 are longer than the intermediate positioned crush boxes 23. Also, the illustrated crush boxes 23 can be spaced-apart equal or unequal amounts. The crush boxes 23 are each spaced apart by an interconnecting strap 32. The illustrated straps 32 include two U-shaped recessed or bowed features 32' (FIG. 4) that extend rearward of the base flange 22, and that are adapted to fit matably into respective recessed channels 35 (FIG. 1) in the face wall 29 of the beam 21 in a manner that helps accurately and stably locate the energy absorber 22 on the beam 21. Specifically, the features 32' help prevent the energy absorber 22 from slipping undesirably up or down during an impact. It is conceived that the straps 32 can include other features to engage and locate on the beam 21, such as hooks or bulbous detents. The channels 35 extend longitudinally across the face wall 29 of the beam 21, and are positioned generally in front of the respective top and bottom tubular sections on the beam 21. It is preferable that the walls 25-29 be kept relatively planar and flat and that the crush boxes 23 have parallel walls or be pyramid or trapezoidal in shape, but it is noted that there will be some distortion of the walls due to natural thermoforming properties. Also, the walls must have some draft angle, such as 1° to 2°, to facilitate the thermoforming process. It is further noted that the walls 25-29 are joined to each other and to base flange 24 by small radii, which is a necessary and industry-wide practice in the thermoforming industry to prevent tearing and to facilitate stretching of material during the thermoforming process. Typical radii are at least about equal to a thickness of the material. However, it is widely accepted in the industry to provide larger radii as needed to prevent walls from becoming too thin in high stretch areas.

Additional modified bumper systems and energy absorbers are shown in FIGS. 8-20. In these additional systems and components, many of the identical or similar components, parts, and features are labeled using the same identification number but with addition of a letter "A", "B", "C" or etc. This is done to reduce unnecessary and redundant discussion. However, it is noted that sometimes two similar thermoformed sheets are bonded together, such that different numbers are used to avoid confusing the two sheets. (For example, see FIGS. 11 and 38.)

Bumper system 20A (FIG. 8) includes a "B" beam 21A and a thermoformed energy absorber 22A on its face. In energy absorber 22A, the crush boxes 23A have an "I" shape or sideways "H" shape in front view. This gives the individual crush boxes 23A added strength and stability. It is contemplated that the crush boxes 23A can be other shapes as well, such as "T" or "X" or "C" or "O" or "N" shapes. Notably, the face or front wall 29A of the energy absorber 22A is generally flat, but may be contoured vertically and horizontally to match a profile of the fascia, such as being tapered near ends of the beam 21A. Also, the straps 32A provide some longitudinal flexibility to the energy absorber 22A. By this arrangement, the face wall 29A better matches the aerodynamic curvilinear shape commonly found on modern passenger vehicles.

The bumper system 20B (FIG. 9) includes a B-shaped beam 21B (or a D-shaped beam 21B'), a thermoformed energy absorber 22B, and a second intermediate energy absorber in the form of one of the energy absorbers 37B, 37C, or 37D. The energy absorbers 37B, 37C, or 37D are interchangeable, and illustrate an advantage of the present thermoformed energy absorber 22B. Each energy absorber 37B, C, D includes a ridge shaped to fit into a channel-shaped recess 35B (or 35B') on the beam 21B (or 21B'). The energy absorber 37B includes a one-piece injection-molded component 38B made of an injection-moldable material such as XENOY (made by GE Company) forming box-like energy-absorbing blocks 39B and interconnecting U-shaped straps 40B, and further includes a plurality of energy-absorbing foam blocks 41B positioned between the blocks 39B. The box-like blocks 39B are hollow and include open rear sides so that they can be made by a single simple injection molding process. The foam blocks 41B fit snugly between the box-like blocks 39B. The thermoformed energy absorber 22B forms a cap closing a face of the intermediate energy absorber 37B. The energy absorber 37C is a complete one-piece, injection-molded component, and includes rearwardly-open box-like blocks 39C and further includes forwardly-open areas 42C interconnecting the box-like blocks 39C. The intermediate energy absorber 37D is made entirely from foam and is adapted to replace the energy absorber 37C. Alternatively, the foam energy absorber can be made to abut a face of the injection molded energy absorber 37C. As can be seen, a variety of different intermediate energy absorbing components and hybrids can be positioned between or with the beam 21B and the thermoformed energy absorber 22B.

It is contemplated that a thermoformed energy absorber can be constructed that replicates a majority of the front surface of the illustrated energy absorber 22B while also replicating a substantial part of the rear surface of the foam blocks 41B, such that it mates with the molded component 38B (such that the need for foam blocks 41B is eliminated) while also providing adequate support to fascia.

Figure 10:
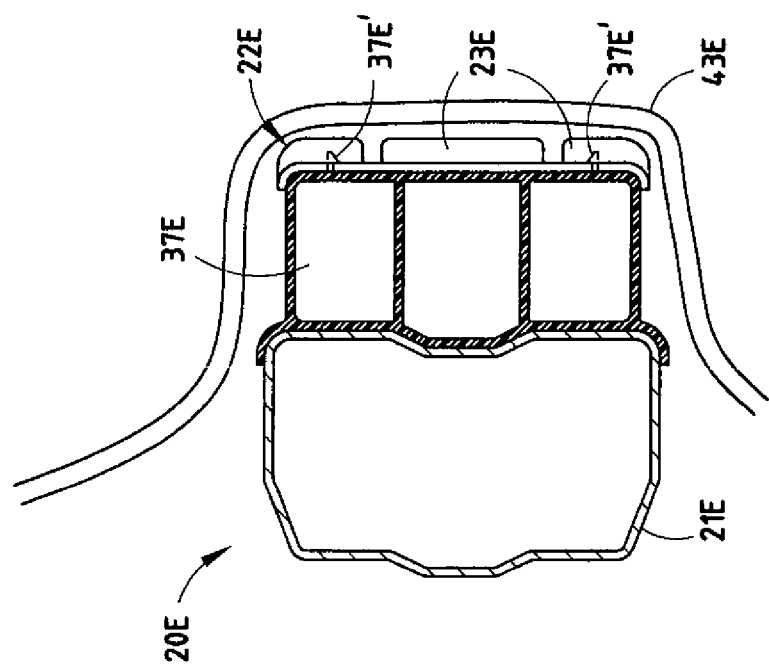
FIG. 10 is a cross-sectional view of FIG. 9.

FIG. 10 illustrates a bumper system 20E that incorporates a D-shaped beam 21E, an injection-molded intermediate energy absorber 37E, and a thermoformed energy absorber 22E, with a TPO front fascia 43E positioned thereon. Advantageously, different thermoformed energy absorbers (22E) with crush boxes (23E) can be used with the beam 21E and primary energy absorber 37E, allowing the same beam 21E and energy absorber 37E to be used on different vehicle models having differently shaped fascia (43E).

Specifically, it is potentially a tremendous advantage to use a common injection-molded part and/or beam on different vehicle platforms or models. The thermoformed energy absorber 22E is used to fill varying sized gaps along the different fascia to address different styling surfaces. The thermoformed energy absorber is particularly advantageous to fill this need, since the tooling is relatively low-cost and can be made relatively quickly, and further the thermoformed energy absorber itself can have a much lower cost and weight, depending on the design and other criteria. It is contemplated that the thermoformed energy absorber 22E can be held in place on a face of the intermediate energy absorber 37E by the front fascia 43E. Alternatively, it is contemplated that various attachment mechanisms can be used to attach the thermoformed energy absorber 22E to the injection-molded intermediate energy absorber 37E, such as by placing hooks 37E' on the intermediate energy absorber 37E that engage apertures or surface features on the thermoformed energy absorber 22E, and/or other male and female connections such as detents and frictional engagement on nesting surfaces, heat staked attachment arrangements, bonding arrangements, and other attachment systems. It is noted that the bumper system 20E of FIG. 10 is very environmentally friendly and uses recyclable components, and in particular does not include either a thermoset material or a foam material that is difficult to recycle. Further, the thermoformed energy absorber can be easily separated from other materials, making it even easier to recycle.

Bumper system 20F (FIGS. 11-11A) includes a D-shaped beam 21F and an energy absorber 50F on its face surface. The energy absorber 50F (FIGS. 11-12) includes a thermoformed sheet 22F and further includes a second sheet 51F coupled to the thermoformed sheet 22F to form air-trapped cavities under the crush boxes 23F. The two sheets 22F and 51F are brought together while hot and compressed at local points to meld and/or bond together to form an airtight seam. In particular, the sheet 51F has a base flange 52F and several bulbous pillow-shaped regions 53F that extend partially into the crush boxes 23F of the sheet 22F. One or more small vent holes 54F are formed in each of the pillow-shaped regions 53F. The sheet 51F can have a thickness similar to the sheet 22F, or can be substantially thinner, such as 0.5 mm or even 0.1 mm. The preferred sheet thickness depends on functional requirements and the material selection for the sheet 51F. It is noted that the energy absorber 22F can still have the straps between the crush boxes 22F, (see straps 32 in FIG. 1) where the straps engage the recesses/channels (35) in the face of the beam 21F, but the straps are not shown in FIG. 11 to better show the present invention of sheets 22F and 51F.

It is contemplated that the sheet 51F will maintain its shape and function as follows when the bumper system 20F is impacted. During the initial phase of impact, the crush boxes 23F on sheet 22F affected by the impact begin to collapse, causing air to pressurize within the cavities 52F. As pressure increases, the air begins to escape through vent holes 54F. As the front wall 29F of the sheet 22F reaches a front surface of the pillow-shaped regions 53F, the sides of the pillow-shaped regions 53F have expanded and engage and support the walls of the crush boxes on sheet 22F. Upon further crushing, the sheets 22F and 51F collapse together. Notably, during this later phase of collapse, the walls of the sheets 22F and 51F support each other and increase an overall strength of the crush boxes 23F. Optimally, the sheets 22F and 51F are made from material having a memory, so that they recover their shape after impact.

Energy absorber 22F' (FIGS. 12-12A) is similar to FIG. 11, but the pillow-shaped regions 53F' are box-shaped or trapezoidal-shaped to fit into and match a bottom half of the sidewalls (25F'-28F') of the crush boxes 23F' on the sheet 22F'. Thus, the walls of sheet 51F' engage and support and reinforce the walls 25F'-28F' of the energy absorber 22F' during a final phase of a crushing impact.

A variety of different shapes and arrangements are contemplated for the concept of trapping air within and between thermoformed sheets. Not only can the material and thicknesses of the two sheets be varied, but also the shapes of the crush boxes, the shapes of the pillow-shaped areas, and the shapes, size and number of vent holes. It is also contemplated that different fillers can be put into the cavities, other than air. However, the light weight and low cost of air is difficult to match while still maintaining a competitive, low weight system.

FIG. 13 illustrates a bumper system 20G with a beam 21G and a thermoformed energy absorber 22G where the sidewalls 26G-28G include planar sections 58G, 59G and 60G connected by offsets 61G and 62G. A front wall 29G closes a front of each crush box 23G. The offsets 61G-62G cause the planar sections 58G-60G to telescope together in stages and in a predictable energy-absorbing manner, as illustrated in FIGS. 13-16. As illustrated, the sections 58G and 59G first telescope together (FIG. 14) and then the sections 59G and 60G telescope together. Thereafter, the entire thermoformed energy absorber 22G collapses to an ultra-thin state where it takes up very little thickness. The thinness of the collapsed system is considered to be an important property of the energy absorbers 22-22G. Since the sheet that the thermoformed energy absorbers are made from is relatively thin, its collapsed state is virtually only about double or maybe triple a thickness of the original sheet thickness. Thus, it takes "full advantage" of the limited space that it occupies, by both filling the space for maximum energy absorption and by providing a maximum stroke for absorbing that energy upon impact.

Figure 17:
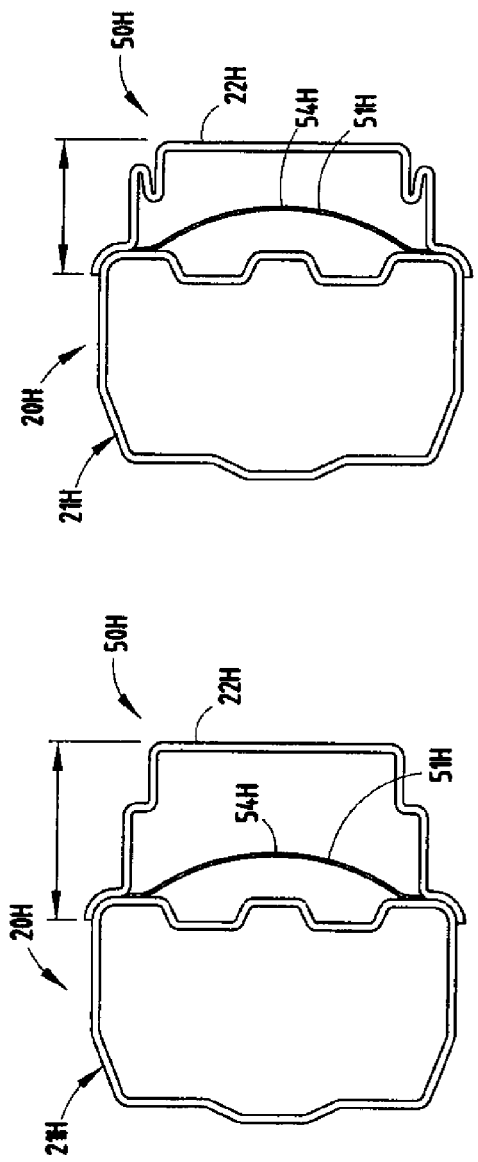
FIGS. 17-20 are cross sections of a sixth modified energy absorber similar to FIG. 11, the FIGS. 18-20 showing a crush sequence upon impact of the energy absorber of FIG. 17.
Figure 18:
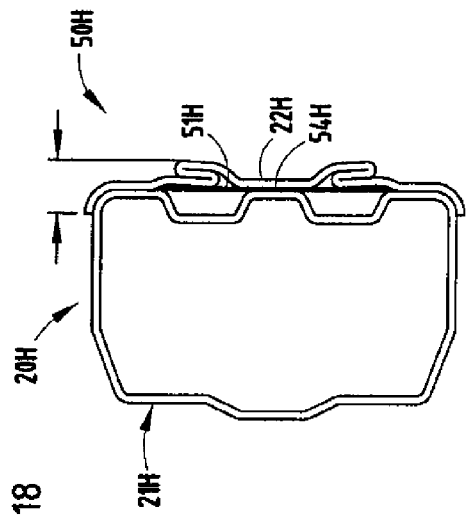
Figure 19:
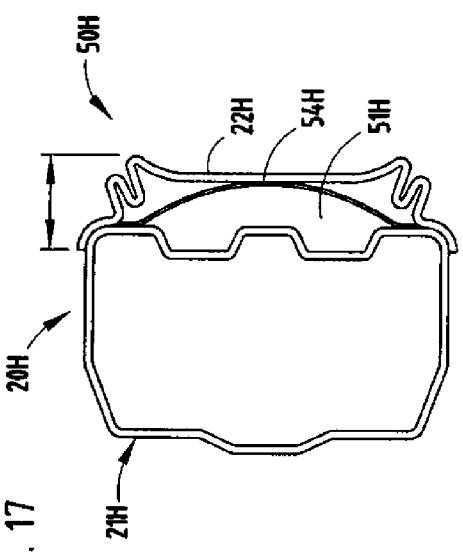
Figure 20:
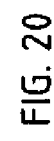

FIG. 17 illustrates another bumper system 20H having a beam 21H and a thermoformed energy absorber 50H similar to energy absorber 22G, but incorporating an air-trapping sheet 51H similar to the sheet 51F (FIGS. 11-12), specifically, when impacted. The sheet 22H is collapsed down to the level of sheet 51H, with entrapped air being expelled through vent hole 54H. Then, the sheets 22H and 51H collapse together (FIGS. 18-20), providing an increased rate of energy absorption.

Figure 21:
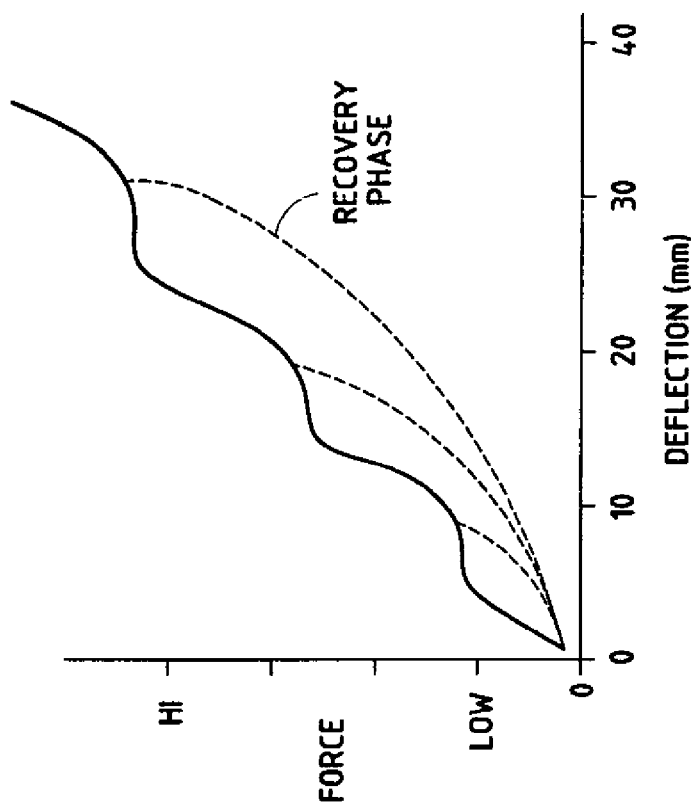
FIG. 21 is a graph showing a force vs deflection curve showing a stepped increase in force and energy absorption over distance of crush, including showing recovery of the energy absorber after release of the impacting body.

FIG. 21 shows force deflection curve of the three-step collapse of energy absorber 22G. A similar stepped energy absorption graph will occur with energy absorber 50H, although the steps will be at different heights and will be affected by the energy dissipated by the escaping trapped air.

Figure 22A:
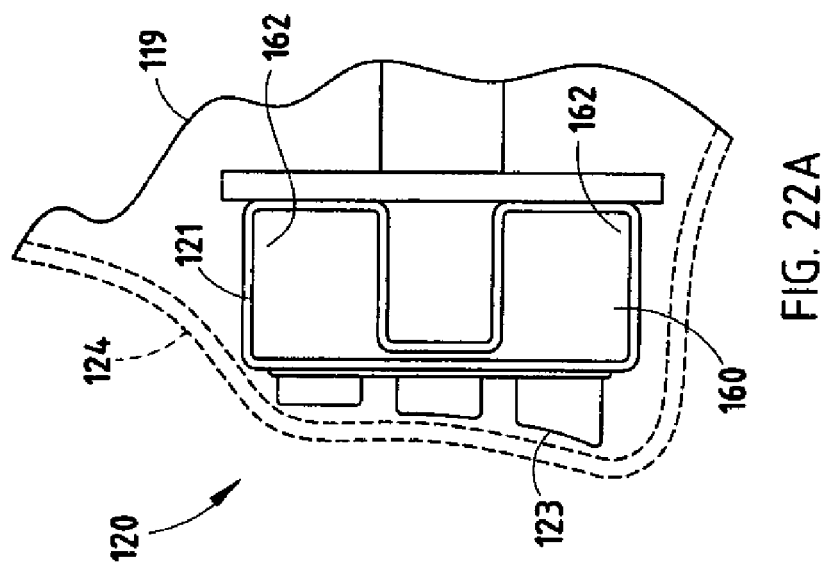
FIGS. 22-22A are cross-sectional views showing a front bumper system incorporating a thermoformed energy absorber of the present invention.
Figure 22:
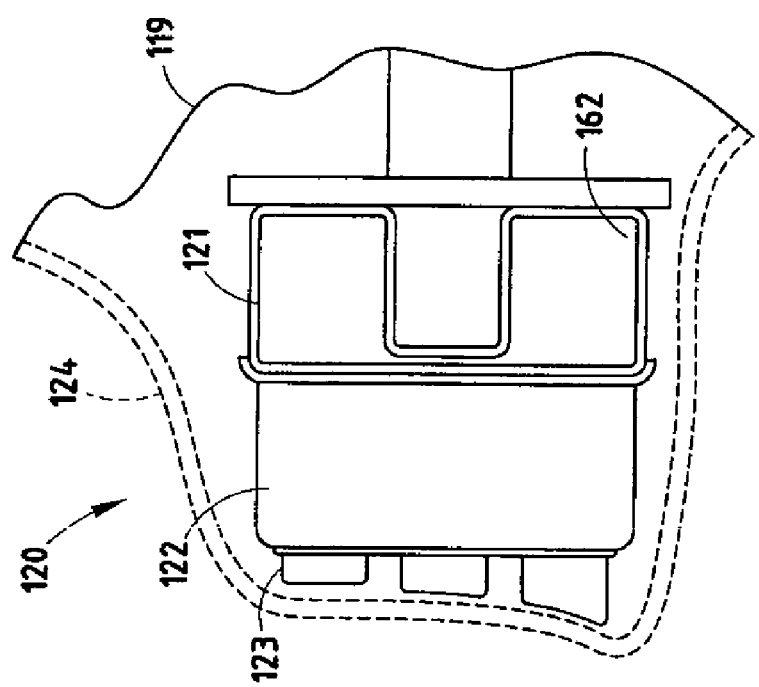

The illustrated arrangement includes a front end 119 (FIG. 22) of a vehicle having a bumper system 120 comprising a reinforcement beam 121, a primary energy absorber 122, and a thermoformed secondary energy absorber subassembly 123, all covered by a fascia 124. The thermoformed energy absorber subassembly 123 provides low-cost supplemental energy absorption to the bumper system, and is very useful when fine-tuning the bumper system for particular model vehicles. This potentially lets the same bumper system be used on different vehicles, but with the addition of the thermoformed absorber subassembly 123 for the "extra" energy absorbing capability required for that particular vehicle. Also, the thermoformed absorber subassembly 123 can be made relatively thin, such as 30 mm to 20 mm or less, or can be made tapered from end to end, such that the thermoformed absorber subassembly 123 can be used in small "empty" areas previously wasted and not used to absorb energy. Also, the thermoformed absorber subassembly 123 can be used as a fascia support component to support fascia having different appearance surfaces and contours, while still allowing use of the same bumper beam and primary energy absorber underneath. (Notice the curved vertical face surface of the energy absorber 123 in FIGS. 22 and 22A. Compare to the flat face surface in FIG. 10.) Notably, the thermoformed absorber subassembly 123 can potentially be used directly on the reinforcement beam 121 (FIG. 22A) depending upon whatever amount of energy absorption and fascia support is desired. Also, the systems of FIGS. 22 and 22A can be used on front or rear ends of vehicles, and in other applications requiring energy absorption upon impact.

As noted above, it is envisioned that a variety of different shapes, arrangements, and configurations can be constructed using the present concepts. Accordingly, although every single possible combination is not explicitly described herein, all such combinations and variations are intended to be covered by the present description, as may be reasonably understood from this description. Keeping this in mind, the following descriptions are organized to describe several different single thermoformed sheets; and then to describe two inter-engaging sheets with energy-absorbing crush boxes that interfit and interact upon impact; and to describe two sheets bonded together to define air-trapping crush boxes. By the different arrangements, a wide variety of different force-versus-deflection curves can be achieved, including stepped energy absorption curves, and energy absorption curves where substantial energy is absorbed upon impact.

Figure 23:
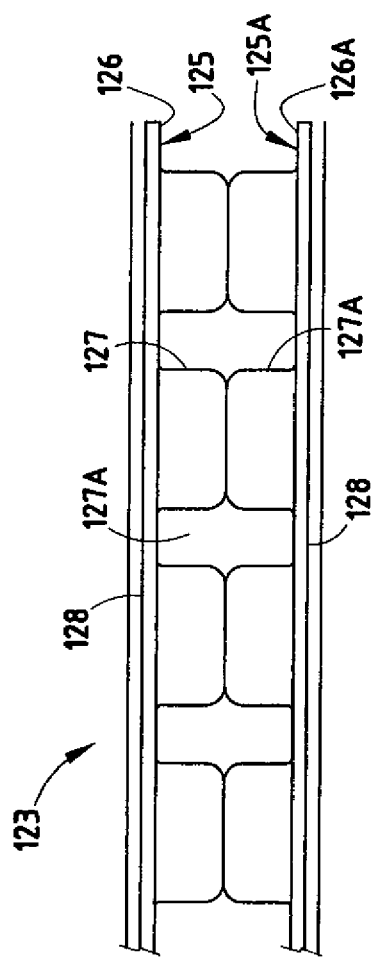
FIG. 23 is a side view of the thermoformed energy absorber of FIG. 22.
Figure 24A:
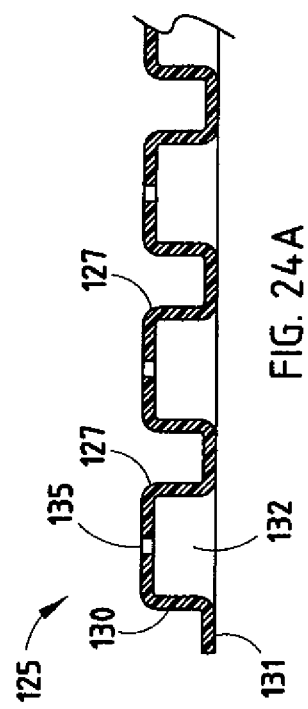
FIG. 24A is a cross section taken along the line IIIA-IIIA in FIG. 24.
Figure 24:
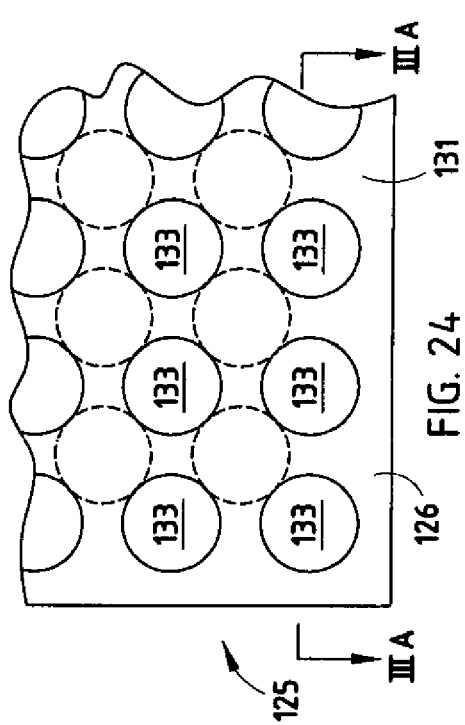
FIG. 24 is a plan view of one polymeric sheet from the energy absorber of FIG. 23, the sheet including a pattern of thermoformed crush boxes.

The energy absorber subassembly 123 (FIG. 23) includes two sheets 125 and 125A of thermoformed polymeric material, each sheet defining a base wall 126 and 126A, (see also FIGS. 24-25) respectively, with a plurality of crush boxes 127 and/or 127A thermoformed therein, and further includes a pair of backing sheets 128 attached to a back of the sheets 125 and 125A. The sheets 125 and 125A will initially be described, then their combination with the backing sheets 128. Thereafter, several variations of sheets 125 and 125A will be described. The variations of sheets 125 will be described by using the letters "A", "B", etc. for similar and/or identical features and aspects.

Each crush box 127 of sheet 125 (FIGS. 24 and 24A) includes a sidewall 130 thermoformed from marginal material 131 in the base wall 126. The thermoformed material forms an opening 132 into a center of the crush box 127, and a floor flange 133 spaced from the sidewall 130 and closing a remote end of the crush box 127. Notably, it is known in the art of thermoforming processes to include a radius at the corner formed by the sidewall 130 and floor flange 133 (and also to include a radius at the corner formed by the sidewall 130 and the base wall 126) in order to avoid over-stretching and weakening and/or tearing the polymeric sheet material during the thermoforming process. It is contemplated that the sidewall 130 may be any variety of different shapes, including cylindrical, frustoconical, rectangular, oval, obround, pyramid, "X" shaped, "I" shaped, or any other structural shape that may be desired. The floor flanges 133 in the illustrated energy absorber sheet 125 are all cup-shaped and are the same height and size. The illustrated arrangement of the crush boxes 127 on the sheet 125 forms a rectangular array and looks much like a cupcake baking pan. It is contemplated that other patterns and crush box shapes (such as flat-sided pyramids) are also possible. An orifice or aperture 135 may be included on the top or side of each crush box 127, if desired, for air flow or for tuning to provide an optimal crush strength. Also, sheet thickness and material can be changed to tune the energy absorber to have a desired force-deflection curve and impact energy absorption.

The energy absorber sheet 125A (FIGS. 25-26) includes a similar array of crush boxes 127A that identically match the pattern and size of the crush boxes 127 on sheet 125, and further includes interspersed within the array a second pattern of taller crush boxes 127A'. The illustrated crush boxes 127A' are about double the height of the crush boxes 127A, and are shaped and positioned to fit between the crush boxes 127. By this arrangement, a top of the crush boxes 127A' engage the base wall 126 of the sheet 125. Also, the shorter crush boxes 127A engage ends of the crush boxes 127. (See FIG. 28.) As illustrated in FIG. 28, the two energy absorbers 123 and 123A can be arranged with their crush boxes 126 interfitting, such that their sidewalls 130 and 130A engage and support each other. (See the dashed lines in FIG. 24, which illustrates crush boxes on a mating sheet that interfit with and support the crush boxes 126 on the illustrated sheet.) Notably, any one or more of the crush boxes 127, 127A, 127A' can be made shorter or longer, which would result in a stepped force-versus-displacement curve. Thus, a different level of energy absorption is provided depending upon a length of the impact stroke experienced. This is a very useful property, and allows bumper systems to be tuned to match particular functional requirements.

A backing sheet 128 (FIG. 27) is (optionally) attached to a rear surface of the marginal material 131 around each crush box 127 on the sheet 125, covering the open side of the crush boxes 127. This traps air within the cavities 132 of the crush boxes 127, forming an air cushion upon impact. An orifice 135 is formed in the backing sheet 128 (or in the sidewall) to allow air to escape in a controlled manner upon impact, so that the crush boxes 127 do not explode unless there is a severe impact. The orifice 135 can be made any size desired, and multiple orifices can be used if desired. Also, it is contemplated that channels 132' (FIG. 27) can be formed in the backing sheet 128 to communicate escaping air from one crush box 127 to an adjacent crush box 127. This distributes stress as well as provides a "fluid" air cushion. Notably, the channels can be sized to control a speed of airflow, as well as routing of airflow.

The sheets 125, 125A and 128 can be any material or thickness. In the illustrated arrangement of FIG. 23, it is contemplated that the sheets 125 and 125A will have enough strength and wall thickness to provide good energy absorption upon collapse of their sidewalls 130 and 130A, such as about 1 mm to 4 mm thickness, or more preferably about 2 mm to 2.5 mm thickness, and will be an impact absorbing material that can be readily thermoformed or vacuum formed. However, the sheet 125 and 125A could be injection-molded or otherwise formed to have thicker or thinner walls, if desired. It is contemplated that the illustrated sheets 125 and 125A will have a total thickness dimension of about 20 mm to 30 mm, but their total thickness can of course be varied as desired. It is further contemplated that the backing sheet 128 and 128A will have a much thinner wall, such as less than 1 mm, and more preferably less than about 0.5 mm, and will be a semi-stretchable and bendable material. Since the backing sheet 128 is positioned against the face of a bumper beam 121, or against a face of a primary energy absorber 122, (or against another backing sheet 128 when multiple subassemblies 123 are layered together), the backing sheet 128 does not need to be 2 mm or thicker . . . though it could be, if desired. The illustrated sidewall 130 extends at about 90° to the base wall 126, but in reality, a small draft angle (such as about 1°) is included to facilitate the thermoforming process. The sidewalls 130 can include larger angles, but it is preferable that the sidewall 130 not be angled more than 45°. It is also contemplated that one (or more) of the sheets 125, 125A, 128 can include laterally-extending flanges and hooks or friction pads that extend rearward onto top and bottom surfaces of the beam 121 (FIG. 22A) to frictionally engage and retain the subassembly 123 onto a beam 121 or primary energy absorber 122 (FIG. 22) or to the fascia 124, if desired. Also, a height of the crush boxes 127 can be varied to achieve a tapered or aerodynamic shape to better match a particular contour, such as a swept bumper face.

Sheets 125B-125H can be interchanged with sheets 125 or 125A. Identical or similar features are identified with the same numbers to simplify the discussion.

The sheet 125B (FIG. 29) has doughnut-shaped crush boxes 127B with sidewalls 130B, but has a modified floor flange 133B, where a center section 140B of the floor flange 133B is reversely thermoformed to position its center section 140B approximately co-planar with the base wall 126B.

An inner sidewall 141B is formed that extends generally parallel the outer sidewall 130B. It is also contemplated that the center section 140B could be only partially deformed, such that it would not be co-planar with base wall 126B . . . in which case the sheet 125B would provide a stepped energy absorption (force-versus-deflection curve).

Sheet 125C (FIG. 30) illustrates a circumstance where the crush boxes 127C are formed from a base wall 126C and have the inner and outer sidewalls 141C and 130C positioned relatively close together. Sheet 125D (FIG. 31) is similar to sheet 125C, but the inner and outer sidewalls 141D and 130D of the crush boxes 127D are positioned relatively farther apart. Sheet 125E (FIG. 32) illustrates a circumstance where the center section 140E is only partially recessed, and is not recessed to be co-planar with the base wall 126E. Sheet 125F (FIG. 33) is similar to sheet 125E, but in sheet 125F, the area 142F between the inner and outer sidewalls 141F and 130F is spaced halfway from base wall 126F, and a center region or end 140F of the center section is thermoformed to be spaced farther away from the base wall 126F than the area 142F. Thus, a protruding tip 143F is formed by center region 140F and inner sidewall 141F. The subassembly 123F' (FIG. 33A) includes a pair of sheets 125F, with the outer sidewalls 130F on one sheet engaging and supporting the inner sidewalls 141F on the other sheet 125F. Sheet 125G (FIG. 34) is similar to sheet 125F, but in sheet 125G, its tip 143G has a much wider end 144G.

Sheet 125H (FIG. 36) illustrates a condition where two different shaped crush boxes 127H and 127H' are formed in the base wall 126H. The first crush box 127H is cylindrically shaped, and extends to a first height. The second crush box 127H' has a shorter cylindrical shape and includes a protruding tip 143H that extends to a height shorter than the crush box 127H. Thus, the sheet 125H will tend to produce a three-stepped or three-level crush curve (force-versus-deflection curve), each level increasing in strength over the previous level. In sheet 125H, the crush boxes 127H and 127H' have outer sidewalls 130H that are spaced apart. However, it is contemplated that a sheet 125I (FIG. 37) can be constructed where the sidewalls 130I support each other at location 130I', as formed on a single sheet without the need for a second sheet.

FIG. 38 shows yet an additional energy absorber 200 where first and second sheets 201 and 202 are each thermoformed to have the shape somewhat like a cupcake pan. Specifically, sheet 201 has a base wall 203 with tower-shaped, pyramid-like projections 204 forming crush boxes of a height 205, and sheet 202 has a base wall 206, with tower-shaped projections 207 forming crush boxes of a lower height 208. Several (or all) of the projections 207 snap or friction-fit into projections 204 with a LEGO™-like engagement to form air cushioning pockets 210. An orifice or aperture 211 can be formed in one of the sheets 201 or 202 to allow air to escape upon impact. Alternatively, the air can escape at corners of the projections. By this arrangement, the energy absorber provides a stepped energy absorption and is able to recover after release of the impacting object. Notably, the side walls of the projections 204 and 207 are inclined both as a draft angle to permit thermoforming, but also so that they further engage during impact to more-tightly seal the air trapped therein. Further, the walls support each other to provide additional support to prevent premature collapse upon impact. This inter-wall support extends only part of the height 205 (i.e., due to the short height 208), such that it results in a stepped energy absorption upon impact.

To summarize, a thermoformed energy absorber can be made from a single sheet, with crush boxes being formed by vacuum forming, or other thermoforming techniques. It is contemplated that the crush boxes can be any shape, including a "cupcake pan" pattern, or other more complicated cup or box shapes. It is contemplated that the crush boxes will be made of material that will recover after impact, although that is not required. The energy absorbers can be made from other processing methods other than thermoforming, such as injection-molding. The energy absorber can be made to provide a single step energy absorption curve (force-versus-deflection curve), or can provide a stepped energy absorption. The sheet can be made to bend to match a swept curvature across a face of reinforcement (metal) beam (or primary energy absorber), and can be configured with flanges such as hooked flanges 160 (FIG. 22A) that engage holes or recesses 162 in the beam 121 or in the primary energy absorber 122 to snap-attach in place.

The energy absorber sheet can be modified by adding a backing sheet to entrap air, such that the sheet provides an air cushion upon impact. Alternatively, the backing sheet can be eliminated by attaching the sheet directly to a beam (or to a fascia) with the crush boxes being held in a sealed arrangement. Orifices and/or channels can be provided to control airflow out of crush boxes during impact, and to communicate the exhausting air to other crush boxes.

Two opposing sheets with inter-engaging and inter-supporting crush boxes can be used as a laminated subassembly. The crush boxes may be identical in shape, or different but matingly shaped. Additional layers of sheets can be added, in addition to just two sheets. The sheets will preferably be made of a material that recovers after impact, and yet that is easily formed.

A bumper system 220 (FIGS. 39-41) includes a reinforcement beam 221, an energy absorber system including an injection-molded primary energy absorber 222, a thermoformed secondary energy absorber 223, and a fascia 224. The thermoformed energy absorber 223 has a base sheet 225 and includes a plurality of crush boxes 226 and 227 extending forwardly into engagement with the fascia 224 for supporting the fascia 224. The crush boxes 226 and 227 are optimally shaped and positioned for a desired local energy absorption by the bumper system 220 upon impact, and further are sized to fit within the package size allowed by the vehicle original equipment manufacturer (OEM). For example, the illustrated crush boxes 226 and 227 have a non-flat front wall 232 shaped to match the vertical cross-sectional shape of the fascia that it supports. Also, the crush boxes 226/227 near the center of the reinforcement beam 221 are taller than crush boxes 226/227 near ends of the beam 221 (see FIG. 41), such that the front walls 232 combine to match the curvilinear shape of the fascia. At the same time, the base sheet 225 defines a larger radius such that it matches a less-sharply curved face of the beam 221 and primarily energy absorber 222.

By substituting (or removing) the thermoformed energy absorber 223, the same beam 221 and primary energy absorber 222 can be used with different fascia (224). Also, the rate of energy absorption upon impact can be advantageously affected. Still further, by substituting a thermoformed energy absorber (223) made of a different modulus material or different sheet thickness, the overall energy absorption curve can be tuned to a desired rate of energy absorption. Notably, the tooling for thermoforming is low-cost and has relatively short lead times for dies. Thus, the bumper system 220 provides for an optimal energy absorption, yet provides flexibility and tuning of the bumper system late in a bumper development program. It is noted that in some applications, the primary energy absorber 222 can be eliminated, and the thermoformed energy absorber 223 used directly on a face of the reinforcement beam 221.

The focus of the present disclosure is on the thermoformed energy absorber 223 and variations thereof. The details of the reinforcement beam (221) and primary energy absorber (222) are not discussed in great detail. Nonetheless, it should be understood that the present thermoformed energy absorber (223) can be used with a variety of different reinforcement beams and primary energy absorbers, including beams with cross sections that are "B" shaped, "D" shaped, and "C" shaped beams, which beams and primary (injection-molded) energy absorbers are well known in the art of vehicle bumper systems.

The thermoformed energy absorber 223 has crush boxes of varying size and shape, each particularly shaped and located for specific regional impact strength and crush characteristics. The illustrated energy absorber 223 includes four "O" shaped crush boxes 226 spaced along the reinforcement beam 221, with sets of the crush boxes 227 being therebetween. Specifically, four crush boxes 227 are located in a center of the energy absorber 223 and three crush boxes 227 are located in the right and left areas of the energy absorber 223. The crush boxes 226 are "O" shaped and are elongated horizontally/longitudinally, and the crush boxes 227 are "I" shaped and are elongated vertically. Nonetheless, as will become apparent below, the crush boxes can be a variety of different shapes and sizes. Notably, the front and top walls 232 and 233 are shaped to support the fascia 224 to prevent sagging of the fascia 224.

Each crush box 226 has opposing side and front walls 230, 231, and 232 that define orthogonally-related planes. The crush box 226 also has top and bottom walls 233 and 234 that are undulating in a longitudinal direction with alternating convex and concave regions 235 and 236. This "box shape" causes the crush box to have good impact stiffness, and causes the walls 230-234 to provide a high initial resistance to crush and then to absorb substantial energy upon impact. Also, the undulations 235/236 in the walls 233-234 further add to stability of the crush boxes, and to the predictability of their energy absorption and ultimate collapse, both of which are important to vehicle bumper systems. Also, the energy absorber 223 is made from a single sheet of material, which allows it to crush flat and take up minimal space after impact. The crush boxes 226 have an open rear area 237 (adjacent the primary energy absorber) to facilitate in-line molding by thermoforming processes. Specifically, the energy absorber defines forward-facing and rearward-facing surfaces, each being open and unobstructed in a linear direction parallel a fore-aft direction and not having undercut surfaces. This allows thermoform tooling to pass linearly through the base flange linearly into the rearwardly facing openings so that the crush boxes can be formed without slides and moving cams on the thermoforming tooling. The side walls 230 and 231 of the illustrated crush boxes 226 are extended longitudinally at their top and bottom corners to define a concavity 238 therebetween at each end of the "O" shape. The overall size of the illustrated crush boxes 226 are elongated about 2:1 in length to width ratio, and more preferably at least one is elongated about 3:1. This also adds to their impact stability. Nonetheless, it is noted that the elongation can be as long as desired, such as up to half of a length of the energy absorber (see FIG. 46) or more.

As apparent to a person of ordinary skill upon studying the FIGS. 39-41 (and FIGS. 42-43, 44-45, and 4648), the crush boxes 226 can be any number of different shapes as needed for particular regions on the bumper system. The undulations 235/236 and concavities 238 around the walls of particular crush boxes add greatly to their stability and energy-absorbing capability. The modified energy absorber 240 (FIG. 42) includes modified crush boxes 241 in addition to the "O" shaped crush boxes 226 and "I" shaped crush boxes 227. The modified energy absorber 245 (FIG. 44) includes the "short" O-shaped crush boxes 226 and longer O-shaped crush boxes 246 positioned in an alternating pattern with the short O-shaped crush boxes 226. The modified energy absorber 250 (FIG. 46) includes a first crush box 251 that is centrally located and that extends half of a length of the energy absorber 250 (and also half of the length of the reinforcement beam 221). Notably, the front wall 252 matches an arcuate contour of a front of the beam 221 (in top view), but the illustrated front wall 252 is relatively flat and does not include any depressions therein. Nonetheless, it is contemplated that ridges, embossments, or depressions can be formed in the front wall 232, if desired, for added stiffness. Two "I" shaped crush boxes 253 with side concavities 254 are positioned on each side of the center crush box 251, and two "C" shaped crush boxes 255 with side concavities 256 are positioned outboard of the crush boxes 253.

Where the thermoformed energy absorber is given a deeper section (such as 3 inches or more) and thicker walls (such as about 4 mm or more), or where the material of the thermoformed energy absorber is relatively stiff (such as by using Xenoy™ material, a material made by GE Corporation for use in energy absorbers), it is contemplated that the walls (230-234) can be designed for spreading the impact load via the following mechanism. In energy absorber 250' (FIG. 48) (which is similar to energy absorber 250), the illustrated top and bottom walls 233 and 234 each have a linear portion 260 near the base sheet 225, a linear portion 261 near the front wall 232, and an offset portion 262 connecting the linear portions 260 and 261. During an impact, the linear portions 260 and 261 are more stable than the offset portion 262. This causes the linear portions 260 and 261 to want to slide parallel each other, while the offset portion 262 tends to pull the leading edges of the linear portions into a middle layer. The result is that the leading edges of the linear portions 260 and 261 wrap back on themselves in a very controlled and predictable energy-absorbing fashion during an impact. Specifically, impact energy is absorbed as the leading edges of the linear portions 260 and 261 are first bent, then pulled inward, and then unbent as they become part of an intermediate planar layer between the remainder of the two linear portions 260 and 261.

It is noted that crush boxes are illustrated having the following shapes: short "O", elongated "O", "I", "C", and elongated line equally about half of the energy absorber. It is also contemplated that the crush boxes can be the following additional shapes: "L", "T", "X", "Z", "H", and "+", or variations and combinations thereof. It is preferable that the crush boxes have walls that are generally planar, but that have undulations for increased stability. Also, the walls may have laterally-facing concavities, such as in a "C" shaped crush box. Where the base sheet between the crush boxes is relatively flat, the energy absorber will flex and bend to conform to the reinforcement beam (or primary energy absorber) that is supporting it.

In the foregoing description, it will be readily appreciated by persons skilled in the art that modifications may be made to the invention without departing from the concepts disclosed herein. Such modifications are to be considered as included in the following claims, unless these claims by their language expressly state otherwise.

The invention claimed is:

1. A method of constructing a bumper system comprising steps of:
   providing a structural beam;
   providing a polymeric energy absorber constructed to fit against a face of the structural beam; and
   thermoforming first and second energy absorbers each constructed to interchangeably fit against a face of the polymeric energy absorber but each defining a differently-shaped front surface adapted to support differently-shaped fascia for a vehicle, whereby the first and second energy absorbers can be selectively attached or left off as part of constructing different bumper systems for a vehicle front end assembly.

2. The method defined in claim 1, wherein the step of thermoforming includes thermoforming spaced-apart crush boxes into a sheet of material as part of a thermoforming process, the crush boxes having opposing side walls and a front wall protruding from a base flange, the crush boxes defining at least two different shapes for providing different energy absorption characteristics upon impact.

3. The method defined in claim 1, wherein the step of thermoforming includes thermoforming spaced-apart crush boxes into a sheet of material as part of a thermoforming process, the crush boxes having opposing side walls and a front wall protruding from a base flange, the side walls having a thickness dimension less than a thickness of the front walls and of the base flange due to the thermoforming process.

4. A method of constructing a bumper system comprising steps of:
   providing a structural beam;
   providing a first energy absorber constructed to fit against a face of the structural beam and adapted to support a first-shaped fascia for a vehicle; and
   thermoforming a second energy absorber constructed to matably fit against a face of the first energy absorber, the second energy absorber including a front surface shaped differently from a face of the first energy absorber such that the second energy absorber is adapted to support a second differently-shaped fascia for a vehicle, whereby the second energy absorber can be selectively attached or left off as part of constructing different bumper systems for a vehicle front end assembly.

5. The method defined in claim 4, wherein the step of thermoforming includes thermoforming spaced-apart crush boxes into a sheet of material as part of a thermoforming process, the crush boxes having opposing side walls and a front wall protruding from a base flange, the crush boxes defining at least two different shapes for providing different energy absorption characteristics upon impact.

6. The method defined in claim 4, wherein the step of thermoforming includes thermoforming spaced-apart crush boxes into a sheet of material as part of a thermoforming process, the crush boxes having opposing side walls and a front wall protruding from a base flange, the side walls having a thickness dimension less than a thickness of the front walls and of the base flange due to the thermoforming process.

7. A method of constructing a bumper system comprising steps of:
   providing a structural beam; and
   thermoforming first and second energy absorbers each constructed to interchangeably fit against a face of the structural beam but each defining a differently-shaped front surface adapted to support differently-shaped fascia for a vehicle, whereby the first and second energy absorbers can be selectively attached or left off as part of constructing a different bumper system for a vehicle front end assembly.

8. The method defined in claim 7, wherein the step of thermoforming includes thermoforming spaced-apart crush boxes into a sheet of material as part of a thermoforming process, the crush boxes having opposing side walls and a front wall protruding from a base flange, the crush boxes defining at least two different shapes for providing different energy absorption characteristics upon impact.

9. The method defined in claim 7, wherein the structural beam has a first face surface defining a relatively-flat first shape, and wherein the step of thermoforming includes forming front walls on the first energy absorber to have a second face surface with a relatively non-flat second shape different than the first shape, the second shape being adapted to engage and support a fascia.

10. A method of tuning an impact-absorbing system to have optimized energy absorption properties upon impact, comprising steps of:
providing a beam assembly including a structural beam;
providing a first sheet of material having known first properties and a first thickness;
thermoforming a first energy absorber from the first sheet of material, the first energy absorber being constructed to fit against a face of the beam assembly and being configured to support an aesthetic cover;
providing a second sheet of material different from the first sheet of material in at least one of properties or thickness; and
thermoforming a second energy absorber from the second sheet of material, the second energy absorber having different energy absorption characteristics; and
assembling the first and second energy absorbers at separate times to a beam assembly as part of tuning the system to have a desired rate of energy absorption, whereby the energy absorption of the system can be quickly and easily tuned late in a vehicle development program.

11. The method defined in claim 10, wherein at least the second energy absorber has crush boxes formed therein with at least one laterally-defined concavity in one of the side walls such that the crush boxes, in front view, define one of an "H" shape, a "T" shape, an "X" shape, and a "C" shape.

12. The method defined in claim 10, include a step of tuning a bumper system by including a step of assembling the beam assembly along with the first energy absorber to a vehicle to form a first vehicle bumper system, testing the first vehicle bumper system for impact energy absorption, and by including a step of assembling the beam assembly along with the second energy absorber to form a second vehicle bumper system for the vehicle, and including testing the second vehicle bumper system with second energy absorber for energy absorption, and thereafter selecting a best one of the two bumper systems for the vehicle.

* * * * *